US012787020B2

(12) United States Patent
Patchava et al.

(10) Patent No.: US 12,787,020 B2
(45) Date of Patent: Nov. 3, 2026

(54) USER EQUIPMENT INITIATED UPLINK TIMING ADVANCE ACQUISITION FOR SELF-SCHEDULED TRANSMISSION

(71) Applicant: QUALCOMM Incorporated, San Diego, CA (US)

(72) Inventors: Raviteja Patchava, San Diego, CA (US); Jing Sun, San Diego, CA (US); Xiaoxia Zhang, San Diego, CA (US); Junyi Li, Greentown, PA (US); Jing Jiang, San Diego, CA (US); Ori Shental, Marlboro, NJ (US); Hung Dinh Ly, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 336 days.

(21) Appl. No.: 18/670,705

(22) Filed: May 21, 2024

(65) Prior Publication Data

US 2025/0365738 A1 Nov. 27, 2025

(51) Int. Cl.
*H04W 72/23* (2023.01)
*H04W 56/00* (2009.01)
(Continued)

(52) U.S. Cl.
CPC ..... *H04W 72/231* (2023.01); *H04W 56/0045* (2013.01); *H04W 72/1268* (2013.01); *H04W 74/0833* (2013.01)

(58) Field of Classification Search
CPC .. H04W 56/0045; H04W 72/21; H04W 72/23
See application file for complete search history.

(56) References Cited

U.S. PATENT DOCUMENTS

2020/0196356 A1* 6/2020 Ko ........................ H04L 5/0053
2021/0329593 A1 10/2021 Lee et al.
2021/0385834 A1* 12/2021 Morozov ............. H04W 72/23

FOREIGN PATENT DOCUMENTS

KR 20220135406 A 10/2022

OTHER PUBLICATIONS

International Search Report and Written Opinion PCT/US2025/029396 ISA/EPO Sep. 16, 2025 (2402905WO).

(Continued)

*Primary Examiner* — Sam Bhattacharya
(74) *Attorney, Agent, or Firm* — Holland & Hart LLP / Qualcomm

(57) ABSTRACT

Methods, systems, and devices for wireless communication are described. Various aspects relate generally to mechanisms according to which a user equipment (UE) may acquire an uplink timing advance for a UE self-scheduled transmission. Some aspects more specifically relate to a configuration of a set of random access resources associated with an uplink timing advance acquisition for UE self-scheduled transmissions. In some examples, the UE may receive information indicative of the set of random access resources via control signaling and may transmit a random access message in accordance with a random access resource from the set of random access resources to acquire an uplink timing advance for a UE self-scheduled transmission. The UE may transmit the random access message in accordance with the random access resource from the set of random access resources to indicate an intention of the UE to acquire an uplink timing advance for a UE self-scheduled transmission.

30 Claims, 17 Drawing Sheets

(51) Int. Cl.

| | |
|---|---|
| ***H04W 72/1268*** | (2023.01) |
| ***H04W 72/231*** | (2023.01) |
| ***H04W 74/0833*** | (2024.01) |

(56) References Cited

OTHER PUBLICATIONS

ZTE: "Considerations on Procedures related to NOMA", 3GPP TSG RAN WG1 Meeting #93, R1-1805842, 3rd Generation Partnership Project, Mobile Competence Centre, 650, Route Des Lucioles, F-06921 Sophia-Antipolis Cedex, France, vol. RAN WG1, No. Busan, Korea, May 21, 2018-May 25, 2018, May 20, 2018, 13 Pages, XP051441062, section 3, p. 4 figure 2.2.

* cited by examiner

USER EQUIPMENT INITIATED UPLINK TIMING ADVANCE ACQUISITION FOR SELF-SCHEDULED TRANSMISSION

FIELD OF TECHNOLOGY

The following relates to wireless communication, including user equipment (UE) initiated uplink timing advance acquisition for self-scheduled transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may attempt to establish a connection, such as a radio resource control (RRC) connection, with a base station by performing a random access procedure. In accordance with the random access procedure, the UE and the base station may exchange random access signaling until the connection between the UE and the base station is established. The random access procedure may be a two-step random access procedure or a four-step random access procedure.

SUMMARY

The systems, methods, and devices of this disclosure each have several innovative aspects, no single one of which is solely responsible for the desirable attributes disclosed herein.

A method for wireless communication by a user equipment (UE) is described. The method may include receiving control signaling that indicates an uplink resource pool associated with UE self-scheduled transmissions and that indicates a set of random access resources associated with an uplink timing advance acquisition for the UE self-scheduled transmissions, transmitting a first random access message in accordance with a random access resource from the set of random access resources associated with the uplink timing advance acquisition for the UE self-scheduled transmissions, receiving, via a second random access message, an indication of an uplink timing advance based on the first random access message, and transmitting, via an uplink resource from the uplink resource pool associated with the UE self-scheduled transmissions, an uplink data message in accordance with the uplink timing advance.

A UE for wireless communication is described. The UE may include one or more memories storing processor executable code, and one or more processors coupled with the one or more memories. The one or more processors may individually or collectively be operable to execute the code to cause the UE to receive control signaling that indicates an uplink resource pool associated with UE self-scheduled transmissions and that indicates a set of random access resources associated with an uplink timing advance acquisition for the UE self-scheduled transmissions, transmit a first random access message in accordance with a random access resource from the set of random access resources associated with the uplink timing advance acquisition for the UE self-scheduled transmissions, receive, via a second random access message, an indication of an uplink timing advance based on the first random access message, and transmit, via an uplink resource from the uplink resource pool associated with the UE self-scheduled transmissions, an uplink data message in accordance with the uplink timing advance.

Another UE for wireless communication is described. The UE may include means for receiving control signaling that indicates an uplink resource pool associated with UE self-scheduled transmissions and that indicates a set of random access resources associated with an uplink timing advance acquisition for the UE self-scheduled transmissions, means for transmitting a first random access message in accordance with a random access resource from the set of random access resources associated with the uplink timing advance acquisition for the UE self-scheduled transmissions, means for receiving, via a second random access message, an indication of an uplink timing advance based on the first random access message, and means for transmitting, via an uplink resource from the uplink resource pool associated with the UE self-scheduled transmissions, an uplink data message in accordance with the uplink timing advance.

A non-transitory computer-readable medium storing code for wireless communication is described. The code may include instructions executable by one or more processors to receive control signaling that indicates an uplink resource pool associated with UE self-scheduled transmissions and that indicates a set of random access resources associated with an uplink timing advance acquisition for the UE self-scheduled transmissions, transmit a first random access message in accordance with a random access resource from the set of random access resources associated with the uplink timing advance acquisition for the UE self-scheduled transmissions, receive, via a second random access message, an indication of an uplink timing advance based on the first random access message, and transmit, via an uplink resource from the uplink resource pool associated with the UE self-scheduled transmissions, an uplink data message in accordance with the uplink timing advance.

Some examples of the method, UEs, and non-transitory computer-readable medium described herein may further include operations, features, means, or instructions for receiving, via the control signaling, information indicative of a second set of random access resources associated with a connection establishment between the UE and a network entity, where the second set of random access resources associated with the connection establishment may be independent of the set of random access resources associated with the uplink timing advance acquisition for the UE self-scheduled transmissions.

Some examples of the method, UEs, and non-transitory computer-readable medium described herein may further include operations, features, means, or instructions for receiving, via the control signaling, information indicative of a set of random access channel occasions associated with the uplink timing advance acquisition for the UE self-scheduled transmissions, where the set of random access resources includes the set of random access channel occasions, and where the first random access message may be transmitted via a random access channel occasion from the set of random access channel occasions.

Some examples of the method, UEs, and non-transitory computer-readable medium described herein may further include operations, features, means, or instructions for receiving, via the control signaling, information indicative of a set of random access preambles associated with the uplink timing advance acquisition for the UE self-scheduled transmissions, where the set of random access resources includes the set of random access preambles, and where the first random access message includes a random access preamble from the set of random access preambles.

In some examples of the method, UEs, and non-transitory computer-readable medium described herein, the set of random access preambles includes a set of multiple subsets of random access preambles and each subset of random access preambles from the set of multiple subsets of random access preambles corresponds to a respective confidence level associated with a current uplink timing advance at the UE.

In some examples of the method, UEs, and non-transitory computer-readable medium described herein, each subset of random access preambles from the set of multiple subsets of random access preambles may be associated with a respective cyclic shift step size of a set of multiple cyclic shift step sizes, each respective cyclic shift step size corresponding to a different confidence level at the UE.

Some examples of the method, UEs, and non-transitory computer-readable medium described herein may further include operations, features, means, or instructions for selecting the random access preamble from a first subset of random access preambles in accordance with the UE having a first confidence level associated with the current uplink timing advance at the UE, where the first subset of random access preambles corresponds to the first confidence level and transmitting the first random access message including the random access preamble in accordance with the current uplink timing advance at the UE, where the indication of the uplink timing advance may be a relative value with respect to the current uplink timing advance used to transmit the first random access message.

Some examples of the method, UEs, and non-transitory computer-readable medium described herein may further include operations, features, means, or instructions for receiving information indicative of one or more parameters according to which the UE determines a confidence level associated with the current uplink timing advance, where the UE determines a confidence level in accordance with the one or more parameters.

Some examples of the method, UEs, and non-transitory computer-readable medium described herein may further include operations, features, means, or instructions for transmitting the first random access message in accordance with the random access resource from the set of random access resources indicates, in accordance with a rule associated with the set of random access resources, an intention of the UE to acquire the uplink timing advance for a UE self-scheduled transmission via the uplink resource pool.

In some examples of the method, UEs, and non-transitory computer-readable medium described herein, the second random access message excludes an uplink grant in accordance with the first random access message being transmitted in accordance with the random access resource from the set of random access resources associated with the uplink timing advance acquisition for the UE self-scheduled transmissions.

In some examples of the method, UEs, and non-transitory computer-readable medium described herein, the first random access message includes a message 1 (msg1), the second random access message includes a message 2 (msg2), and the UE refrains from monitoring for a message 4 (msg4) based on one or both of the msg2 excluding an uplink grant for a message 3 (msg3) or the msg1 being transmitted in accordance with the random access resource from the set of random access resources associated with the uplink timing advance acquisition for the UE self-scheduled transmissions.

Some examples of the method, UEs, and non-transitory computer-readable medium described herein may further include operations, features, means, or instructions for retransmitting the uplink data message in accordance with the uplink timing advance based on a failure to receive an acknowledgment associated with the uplink data message, transmitting, based on performing a threshold quantity of retransmissions of the uplink data message, a third random access message in accordance with a second random access resource from the set of random access resources associated with the uplink timing advance acquisition for the UE self-scheduled transmissions, receiving, via a fourth random access message, an indication of a second uplink timing advance based on transmitting the third random access message, and retransmitting the uplink data message in accordance with the second uplink timing advance.

In some examples of the method, UEs, and non-transitory computer-readable medium described herein, the third random access message may be transmitted with a greater transmit power than the first random access message.

A method for wireless communication by a network entity is described. The method may include outputting control signaling that indicates an uplink resource pool associated with UE self-scheduled transmissions and that indicates a set of random access resources associated with an uplink timing advance acquisition for the UE self-scheduled transmissions, obtaining a first random access message in accordance with a random access resource from the set of random access resources associated with the uplink timing advance acquisition for the UE self-scheduled transmissions, outputting, via a second random access message, an indication of an uplink timing advance based on the first random access message, and obtaining, via an uplink resource from the uplink resource pool associated with the UE self-scheduled transmissions, an uplink data message in accordance with the uplink timing advance.

A network entity for wireless communication is described. The network entity may include one or more memories storing processor executable code, and one or more processors coupled with the one or more memories. The one or more processors may individually or collectively be operable to execute the code to cause the network entity to output control signaling that indicates an uplink resource pool associated with UE self-scheduled transmissions and that indicates a set of random access resources associated with an uplink timing advance acquisition for the UE self-scheduled transmissions, obtain a first random access message in accordance with a random access resource from the set of random access resources associated with the uplink timing advance acquisition for the UE self-scheduled transmissions, output, via a second random access message, an indication of an uplink timing advance based on the first random access message, and obtain, via an uplink resource from the uplink resource pool associated with the UE self-scheduled transmissions, an uplink data message in accordance with the uplink timing advance.

Another network entity for wireless communication is described. The network entity may include means for outputting control signaling that indicates an uplink resource pool associated with UE self-scheduled transmissions and that indicates a set of random access resources associated with an uplink timing advance acquisition for the UE self-scheduled transmissions, means for obtaining a first random access message in accordance with a random access resource from the set of random access resources associated with the uplink timing advance acquisition for the UE self-scheduled transmissions, means for outputting, via a second random access message, an indication of an uplink timing advance based on the first random access message, and means for obtaining, via an uplink resource from the uplink resource pool associated with the UE self-scheduled transmissions, an uplink data message in accordance with the uplink timing advance.

A non-transitory computer-readable medium storing code for wireless communication is described. The code may include instructions executable by one or more processors to output control signaling that indicates an uplink resource pool associated with UE self-scheduled transmissions and that indicates a set of random access resources associated with an uplink timing advance acquisition for the UE self-scheduled transmissions, obtain a first random access message in accordance with a random access resource from the set of random access resources associated with the uplink timing advance acquisition for the UE self-scheduled transmissions, output, via a second random access message, an indication of an uplink timing advance based on the first random access message, and obtain, via an uplink resource from the uplink resource pool associated with the UE self-scheduled transmissions, an uplink data message in accordance with the uplink timing advance.

Some examples of the method, network entities, and non-transitory computer-readable medium described herein may further include operations, features, means, or instructions for outputting, via the control signaling, information indicative of a second set of random access resources associated with a connection establishment between a UE and the network entity, where the second set of random access resources associated with the connection establishment may be independent of the set of random access resources associated with the uplink timing advance acquisition for the UE self-scheduled transmissions.

Some examples of the method, network entities, and non-transitory computer-readable medium described herein may further include operations, features, means, or instructions for outputting, via the control signaling, information indicative of a set of random access channel occasions associated with the uplink timing advance acquisition for the UE self-scheduled transmissions, where the set of random access resources includes the set of random access channel occasions, and where the first random access message may be output via a random access channel occasion from the set of random access channel occasions.

Some examples of the method, network entities, and non-transitory computer-readable medium described herein may further include operations, features, means, or instructions for outputting, via the control signaling, information indicative of a set of random access preambles associated with the uplink timing advance acquisition for the UE self-scheduled transmissions, where the set of random access resources includes the set of random access preambles, and where the first random access message includes a random access preamble from the set of random access preambles.

In some examples of the method, network entities, and non-transitory computer-readable medium described herein, the set of random access preambles includes a set of multiple subsets of random access preambles and each subset of random access preambles from the set of multiple subsets of random access preambles corresponds to a respective confidence level associated with a current uplink timing advance at a UE.

In some examples of the method, network entities, and non-transitory computer-readable medium described herein, each subset of random access preambles from the set of multiple subsets of random access preambles may be associated with a respective cyclic shift step size of a set of multiple cyclic shift step sizes, each respective cyclic shift step size corresponding to a different confidence level at the UE.

Some examples of the method, network entities, and non-transitory computer-readable medium described herein may further include operations, features, means, or instructions for obtaining the first random access message including the random access preamble from a first subset of random access preambles in accordance with the UE having a first confidence level associated with the current uplink timing advance at the UE, where the first subset of random access preambles corresponds to the first confidence level, and where the first random access message may be obtained in accordance with the current uplink timing advance at the UE and outputting the indication of the uplink timing advance as a relative value with respect to the current uplink timing advance.

Some examples of the method, network entities, and non-transitory computer-readable medium described herein may further include operations, features, means, or instructions for outputting information indicative of one or more parameters according to which the UE determines a confidence level associated with the current uplink timing advance, where obtaining the first random access message including the random access preamble may be in accordance with the one or more parameters.

Some examples of the method, network entities, and non-transitory computer-readable medium described herein may further include operations, features, means, or instructions for obtaining the first random access message in accordance with the random access resource from the set of random access resources indicates, in accordance with a rule associated with the set of random access resources, an intention of a UE to acquire the uplink timing advance for a UE self-scheduled transmission via the uplink resource pool.

In some examples of the method, network entities, and non-transitory computer-readable medium described herein, the second random access message excludes an uplink grant in accordance with the first random access message being output in accordance with the random access resource from the set of random access resources associated with the uplink timing advance acquisition for the UE self-scheduled transmissions.

In some examples of the method, network entities, and non-transitory computer-readable medium described herein, the first random access message includes a msg1, the second random access message includes a msg2, and the network entity refrains from outputting a msg4 based on one or both of the msg2 excluding an uplink grant for a msg3 or the msg1 being obtained in accordance with the random access resource from the set of random access resources associated with the uplink timing advance acquisition for the UE self-scheduled transmissions.

Some examples of the method, network entities, and non-transitory computer-readable medium described herein may further include operations, features, means, or instructions for obtaining a third random access message in accordance with the random access resource from the set of random access resources associated with the uplink timing advance acquisition for the UE self-scheduled transmissions, the first random access message and the third random access message including a same random access preamble, determining that a first received path corresponding to the third random access message may be detected within a threshold time duration of a second received path corresponding to the first random access message, and generating the second random access message in accordance with identifying information associated with both the first random access message and the third random access message based on determining that the first received path corresponding to the third random access message may be detected within the threshold time duration of the second received path corresponding to the first random access message.

In some examples of the method, network entities, and non-transitory computer-readable medium described herein, the threshold time duration includes a cyclic prefix duration.

In some examples of the method, network entities, and non-transitory computer-readable medium described herein, the identifying information may be based on the same random access preamble included by both the first random access message and the third random access message.

Some examples of the method, network entities, and non-transitory computer-readable medium described herein may further include operations, features, means, or instructions for obtaining a third random access message in accordance with a second random access resource from the set of random access resources associated with the uplink timing advance acquisition for the UE self-scheduled transmissions, obtaining a fourth random access message in accordance with the second random access resource from the set of random access resources associated with the uplink timing advance acquisition for the UE self-scheduled transmissions, the third random access message and the fourth random access message including a same random access preamble, determining that a first received path corresponding to the fourth random access message may be detected more than a threshold time duration after a second received path corresponding to the third random access message, and refraining from outputting an indication of a second uplink timing advance associated with either the third random access message or the fourth random access message based on determining that the first received path corresponding to the fourth random access message may be detected more than the threshold time duration after the second received path corresponding to the third random access message.

In some examples of the method, network entities, and non-transitory computer-readable medium described herein, the threshold time duration includes a cyclic prefix duration.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
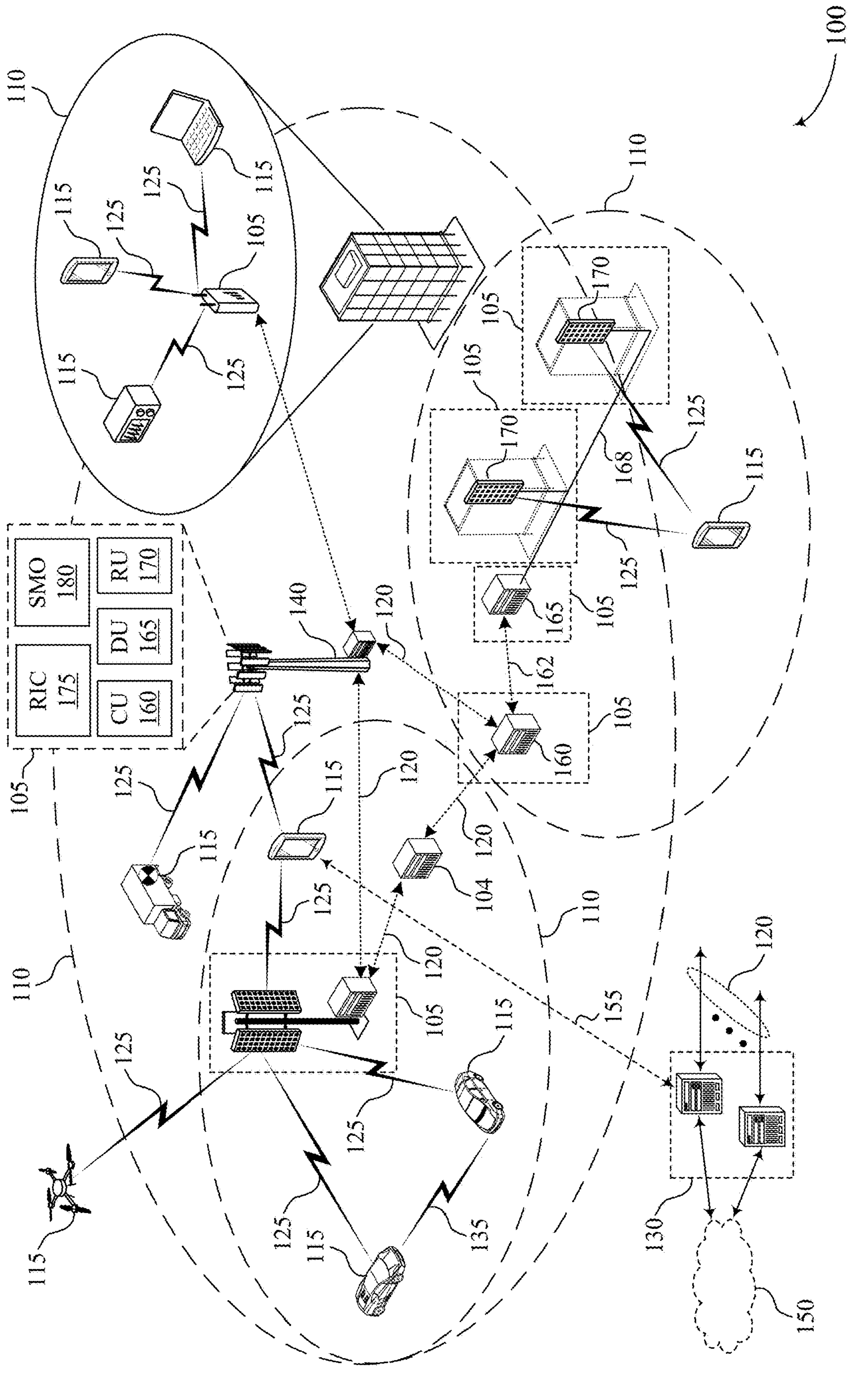
FIG. 1 shows an example of a wireless communications system that supports user equipment (UE) initiated uplink timing advance acquisition for self-scheduled transmission in accordance with one or more aspects of the present disclosure.

In some wireless communication networks, a user equipment (UE) may perform a random access procedure with a network entity for one or more of various reasons. For example, the UE may perform a random access procedure to establish a connection, such as a radio resource control (RRC) connection, with the network entity. Additionally, or alternatively, the UE may perform a random access procedure as part of a handover procedure, a beam recovery procedure, or to acquire an uplink timing advance, among other examples. A random access procedure may be associated with contention-based random access (CBRA) or contention-free random access (CFRA) and, in some networks, which of CBRA or CFRA the UE uses may depend on a reason for the random access procedure. For example, the UE may be expected to use CBRA to acquire an uplink timing advance. In accordance with CBRA, the UE may transmit one or more random access messages and may receive one or more responsive random access messages from the network entity, the one or more responsive random access messages providing an uplink grant for the UE to use and an indication of a connection establishment.

In some deployment scenarios, the UE may support UE self-scheduled transmissions, according to which the UE may (dynamically or in an on-demand manner) select an uplink resource to use for an uplink transmission from an uplink resource pool. The network entity may configure or allocate such an uplink resource pool for UE self-scheduled transmissions (such that, for example, resources from the uplink resource pool are exclusively used for UE self-scheduled transmissions) via control signaling, such as via RRC signaling. In some cases, support for UE self-scheduled transmissions via an uplink resource from the (configured or allocated) uplink resource pool may obviate an uplink grant provided by the network entity via a random access procedure as, for example, the UE may use an uplink resource from the uplink resource pool instead of an uplink grant provided via a random access procedure.

Additionally, in some cases, UEs supporting UE self-scheduled transmissions may sometimes operate without an RRC connection. In other words, UEs supporting UE self-scheduled transmissions may refrain from establishing an RRC connection with the network entity. Thus, in scenarios in which the UE supports UE self-scheduled transmissions, some CBRA procedures may incur unnecessary latency at the UE and unnecessary signaling overhead due to the uplink grant and connection establishment provided by such CBRA procedures. For example, a UE supporting UE self-scheduled transmissions may transmit uplink data relatively infrequently such that most recently received uplink timing advance information (if any) is often invalid (e.g., "expired" or "out-of-date") when the UE has uplink data to transmit. In such examples, the UE may be expected to perform a full or complete CBRA procedure to obtain valid timing advance information prior to transmitting the uplink data, which may result in a lengthy delay and high signaling overhead to obtain the timing advance information. Accordingly, alternative uplink timing advance acquisition mechanisms for UEs that support UE self-scheduled transmissions may benefit some networks.

Various aspects relate generally to one or more signaling- or configuration-based mechanisms according to which a UE may acquire an uplink timing advance for a UE self-scheduled transmission. Some aspects more specifically relate to a configuration of a set of random access resources associated with an uplink timing advance acquisition for (such as exclusively for) UE self-scheduled transmissions. In some examples, the UE may receive, via one or more antennas, information indicative of the set of random access resources via control signaling (such as RRC signaling) and may transmit, via one or more antennas, a random access message in accordance with a random access resource from the set of random access resources to acquire an uplink timing advance for a UE self-scheduled transmission. In some aspects, the UE may transmit the random access message in accordance with the random access resource from the set of random access resources to convey or implicitly indicate an intention of the UE to acquire an uplink timing advance for a UE self-scheduled transmission. The UE may use one or more processors of the UE to select a resource from the set of random access resources, which the UE may store in one or more memories accessible by the UE, to convey or implicitly indicate the intention of the UE to acquire the uplink timing advance for the UE self-scheduled transmission.

The random access message may trigger a random access procedure that is (exclusively) associated with providing an uplink timing advance for a UE self-scheduled transmission. For example, such a random access procedure may provide an uplink timing advance and may be absent of an uplink grant or an indication of a connection establishment. In other words, the UE and a network entity may use one or more respective processors (and one or more respective antennas) to communicate in accordance with a random access procedure that is specifically associated with acquiring or providing an uplink timing advance for a UE self-scheduled transmission. Additional aspects relate to the set of random access resources including one or both of a set of random access preambles or a set of random access channel (RACH) occasions and mechanisms according to which the UE or the network entity may resolve collisions associated with use of the set of random access resources.

Particular aspects of the subject matter described in this disclosure can be implemented to realize one or more of the following potential advantages. In some examples, by providing a set of random access resources associated with an uplink timing advance acquisition for UE self-scheduled transmissions, the UE and the network entity may achieve a mutual understanding of how the UE indicates when an uplink timing advance acquisition is for a UE self-scheduled transmission, which may support greater synchronization between the UE and the network entity along with balancing latency and signaling overhead. Additionally, by triggering or otherwise leading to a random access procedure that is specifically associated with providing an uplink timing advance for a UE self-scheduled transmission, the network entity may selectively transmit more suitable or relevant information to the UE via the random access procedure, which may support lower latency and lower signaling overhead without introducing additional processing complexity at the UE. For example, in accordance with the network entity excluding an uplink grant or an indication of a connection establishment from any responsive random access messages, the UE may refrain from waiting for such signaling and proceed with a UE self-scheduled transmission in accordance with a reception of an uplink timing advance.

Further, by configuring the set of random access resources to include one or both of specific preambles or specific RACH occasions, the UE and the network entity may support various mechanisms according to which the intention of the UE to acquire an uplink timing advance for a UE self-scheduled transmission is detectable without additional hardware at the UE or the network entity, which may support backwards compatibility and lower device complexity. Moreover, in accordance with implementing mechanisms to resolve collisions associated with use of the set of random access resources, the UE and the network entity may support or participate in protocols that enable a relatively large quantity of UEs to acquire an uplink timing advance with a "soft" capacity, as any collisions may be identified and resolved if such collisions adversely impactful to communications within the network. In accordance with such lower latency, lower signaling overhead, backwards compatibility, lower device complexity, and soft capacity, the described techniques may be further implemented to realize greater system capacity, higher data rates, greater spectral efficiency, and longer battery life, among other benefits.

Aspects of the disclosure are initially described in the context of wireless communications systems. Aspects of the disclosure are additionally illustrated by and described with reference to random access procedures, signaling diagrams, and a process flow. Aspects of the disclosure are further illustrated by and described with reference to apparatus diagrams, system diagrams, and flowcharts that relate to user equipment initiated uplink timing advance acquisition for self-scheduled transmission.

FIG. 1 shows an example of a wireless communications system 100 that supports user equipment initiated uplink timing advance acquisition for self-scheduled transmission in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a UE 115 may acquire an uplink timing advance for a UE self-scheduled transmission. For example, a network entity 105 may transmit information indicative of a configuration of a set of random access resources associated with an uplink timing advance acquisition for (such as exclusively for) UE self-scheduled transmissions. The network entity 105 may transmit such information via various types of signaling, including via RRC signaling. In some examples, the UE 115 may receive the information indicative of the set of random access resources and may transmit a random access message in accordance with a random access resource from the set of random access resources to acquire an uplink timing advance for a UE self-scheduled transmission.

In some aspects, the UE 115 may transmit the random access message in accordance with the random access resource from the set of random access resources (the set of random access resources associated with the uplink timing advance acquisition for the UE self-scheduled transmissions) to convey or implicitly indicate an intention of the UE 115 to acquire an uplink timing advance for the UE self-scheduled transmission. In such aspects, the random access message may trigger a random access procedure that is associated with providing an uplink timing advance (e.g., exclusively or dedicated). For example, the network entity may determine to transmit random access signaling in accordance with a random access procedure that is associated with providing an uplink timing advance based on receiving the random access message in accordance with the random access resource from the set of random access resources. Such a random access procedure may provide an uplink timing advance and may be absent of an uplink grant or an indication of a connection establishment, which may reduce overhead signaling and reduce a delay associated with acquiring (e.g., obtaining) uplink timing advance information.

Figure 2:
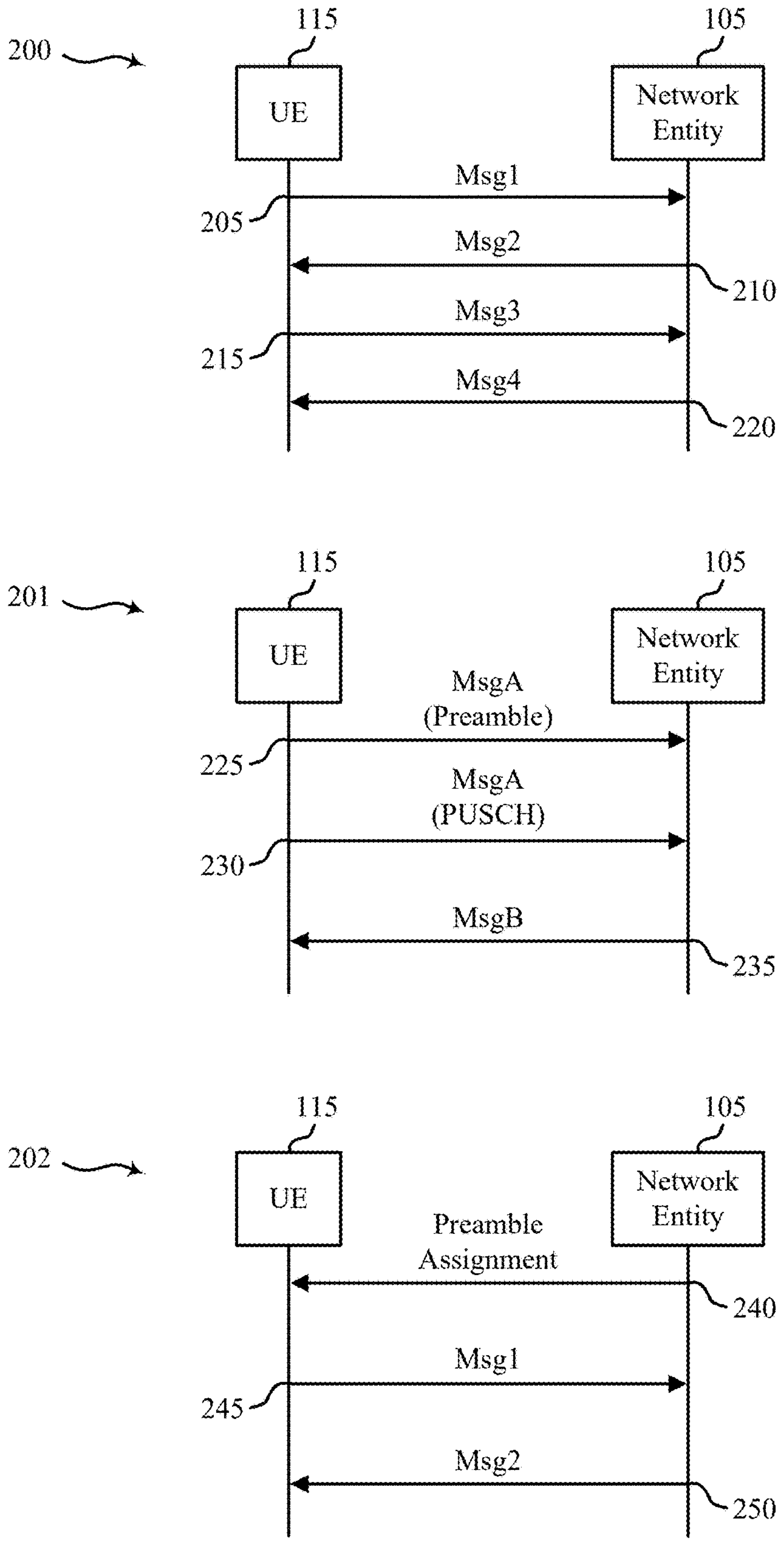
FIG. 2 shows example random access procedures that support UE initiated uplink timing advance acquisition for self-scheduled transmission in accordance with one or more aspects of the present disclosure.

FIG. 2 shows example random access procedures 200, 201, and 202 that support UE initiated uplink timing advance acquisition for self-scheduled transmission in accordance with one or more aspects of the present disclosure. In some aspects, a UE 115 and a network entity 105, each of which may be an example of corresponding devices illustrated and described herein, may perform or otherwise participate in one or more of the random access procedures 200, 201, and 202.

The random access procedures 200 and 201 may be examples of CBRA procedures, either or both of which may be used or implemented in RRC initial connection setup. For example, the random access procedure 200 may be an example of a four-step CBRA procedure and the random access procedure 201 may be an example of a two-step CBRA procedure. In accordance with the random access procedure 200, the UE 115 may transmit a message 1 (msg1) at 205, the network entity 105 may transmit a message 2 (msg2) at 210, the UE 115 may transmit a message 3 (msg3) at 215, and the network entity 105 may transmit a message 4 (msg4) at 220. In some aspects, the UE 115 may select a preamble (such as a random access preamble) randomly and transmit the random access preamble via or within the msg1. The UE 115 may (randomly) select the preamble from a set of preambles that are available for transmission via or within random access messages (such as via or within a msg1). The network entity 105 may transmit information indicative of the set of preambles via control signaling (such as RRC signaling). In some scenarios, there may be a chance of collision if two UEs 115 select the same preamble and, accordingly, a result of the random access procedure 200 may be random and the outcome may not succeed all the time.

In accordance with the random access procedure 201, the UE 115 may transmit a first part of a message A (msgA) at 225, the UE 115 may transmit a second part of the msgA at 230, and the network entity 105 may transmit a message B (msgB) at 235. In some aspects, the first part of the msgA may include a preamble portion of the msgA transmitted via a physical random access channel (PRACH) and the second part of the msgA may include a data portion of the msgA transmitted via a physical uplink shared channel (PUSCH). In other words, the UE 115 may transmit a random preamble followed by a PUSCH data transmission. The network entity 105 may identify a timing advance and allocate resources through the msgB. In some cases, due to a randomness associated with the random access procedure 201, the network entity 105 may not succeed (in determining a timing advance and allocating resources) all the time and the UE 115 may transmit multiple instances of the second part of the msgA (such as the PUSCH part of the msgA), which may be power inefficient and drain a battery of the UE 115.

The random access procedure 202 may be an example of a CFRA procedure, which may be used or implemented in handover, downlink data arrival, or beam recovery. In accordance with the random access procedure 202, the node(s) 104 may transmit an indication of a preamble assignment to the UE 115 at 240, the UE 115 may transmit a msg1 at 245, and the network entity 105 may transmit a msg2 at 250. In other words, the network entity 105 may allocate a preamble to the UE 115 and the UE 115 may transmit the preamble through the msg1, which may be followed by the msg2 response from the network entity 105. In accordance with the network entity 105 allocating the preamble to the UE 115, there may be no collision (or a relatively low likelihood of a collision) and the random access procedure 202 may frequently be successful.

In some scenarios, a UE 115 may perform a random access procedure to acquire an uplink timing advance. In some examples, the UE 115 may attempt to acquire a new, updated, or refreshed uplink timing advance in accordance with a previous timing advance not (e.g., no longer) being valid. A timing advance from a previous transmission may not be valid due to a timing drift at the UE 115, a mobility of the UE 115, or a timing advance expiry (e.g., an expiration of a timer associated with the previous timing advance). In such scenarios, the UE 115 may activate or initiate a CBRA procedure (such as the random access procedure 200 or the random access procedure 201) to acquire an uplink timing advance. In some examples, including examples in which the UE 115 supports UE self-scheduled transmissions, the UE 115 may be unable to use a CFRA procedure in this scenario because the CFRA procedure is initiated from the network entity 105 (and because, in accordance with supporting UE self-scheduled transmissions, the UE 115 may not maintain an RRC connection with the network entity 105).

In accordance with activating or initiating the CBRA procedure to acquire a timing advance, the UE 115 may receive a resource allocation for an uplink transmission. In scenarios in which the UE 115 supports UE self-scheduled transmissions (according to which the UE 115 may not wait for an uplink grant and may instead transmit data using one or more randomly selected resources from, for example, a configured grant (CG)-PUSCH), however, following the CBRA procedure may incur an additional delay as the UE 115 is likely to not use any resource allocation provided by the CBRA procedure (e.g., provided through msg4 or msgB). Further, a second part of a msgA transmission may be limited in terms of usefulness in accordance with the UE 115 intending to acquire a new, updated, or refreshed uplink timing advance. Accordingly, in some implementations of the present disclosure, the UE 115 may support a signaling design for a PRACH procedure that may be initiated from or by the UE 115 for an uplink transmission (such as for a UE self-scheduled uplink transmission).

Figure 3:
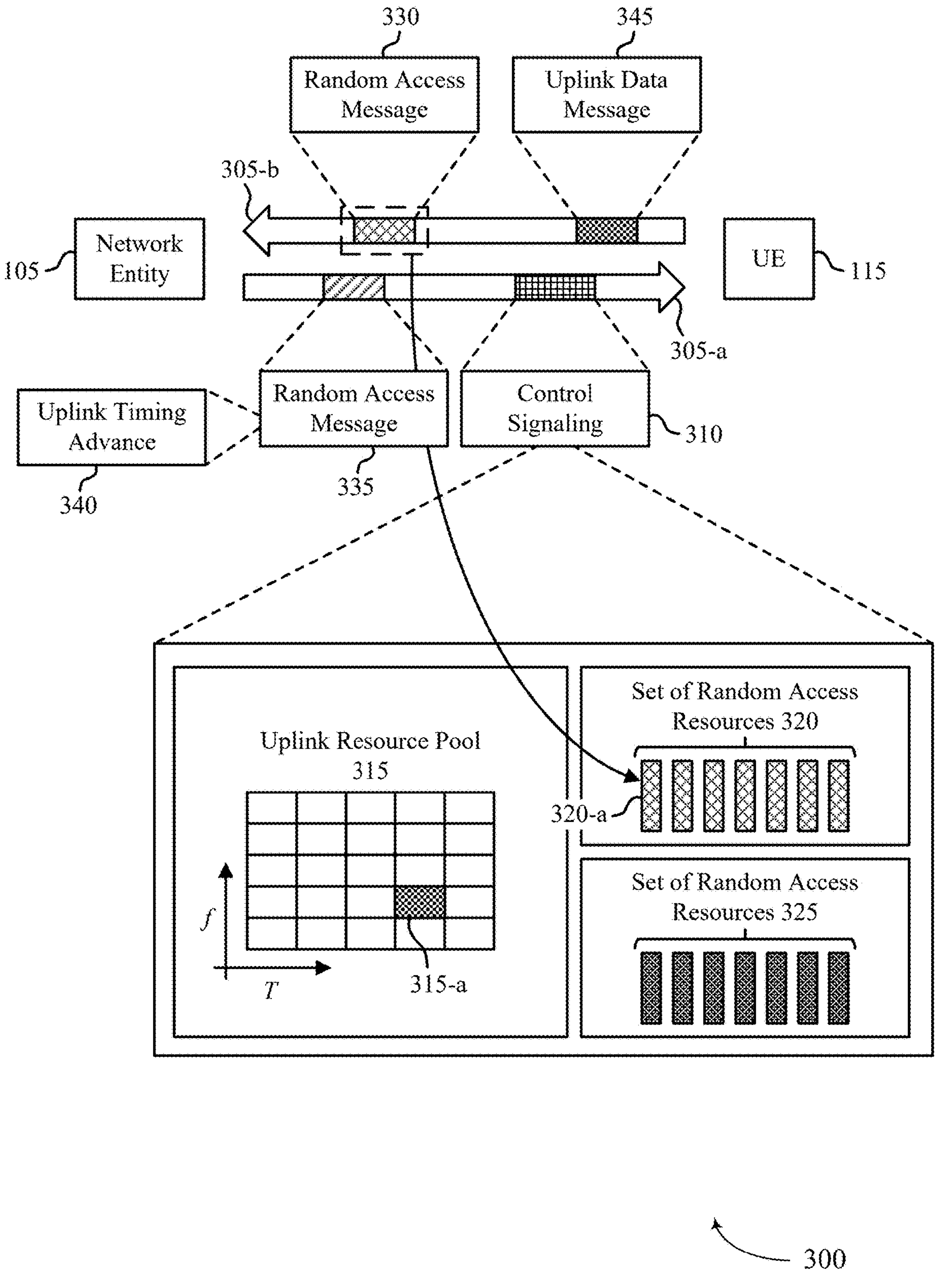
FIGS. 3 and 4 show example signaling diagrams that support UE initiated uplink timing advance acquisition for self-scheduled transmission in accordance with one or more aspects of the present disclosure.

FIG. 3 shows an example signaling diagram 300 that supports UE initiated uplink timing advance acquisition for self-scheduled transmission in accordance with one or more aspects of the present disclosure. The signaling diagram 300 illustrates communication between a UE 115 and a network entity 105, each of which may be examples of corresponding devices illustrated and described herein. As illustrated in the example of the signaling diagram 300, the network entity 105 may transmit signaling to the UE 115 via a communication link 305-*a* (e.g., a downlink) and the UE 115 may transmit signaling to the network entity 105 via a communication link 305-*b* (e.g., an uplink).

In some deployment scenarios, per UE 115 uplink scheduling from or by the network entity 105 may result in the network entity 105 transmitting a relatively large amount of signaling, particularly in scenarios of a relatively large quantity of UEs 115 (e.g., IoT devices within an IoT deployment scenario). In such deployment scenarios, a UE self-scheduled uplink transmission may reduce the amount of signaling overhead by or at the network entity 105. For example, instead of scheduling a set of one or more uplink transmissions from a set of one or more UEs 115, the network entity 105 may enable the set of UEs 115 to self-schedule their uplink transmissions. The UE 115 and the network entity 105 may support UE self-scheduled transmissions in various scenarios, including scenarios in which UE traffic is relatively sparse (such that uplink transmissions, from a specific UE 115 or from a set of UEs 115, are relatively infrequent).

In some examples, the network entity 105 may transmit control signaling 310 (such as RRC signaling) that indicates an uplink resource pool 315 that the set of UEs 115 may use for self-scheduled transmissions. The uplink resource pool 315 may be a set of contiguous or non-contiguous time-frequency resources. For example, the network entity 105 may provide the uplink resource pool 315 for or as a CG-PUSCH and each UE 115 of the set of UEs 115 may select (such as randomly select) an uplink resource from the uplink resource pool 315 and transmit uplink data via the selected uplink resource. Additionally, in some examples, the network entity 105 may transmit information indicative of one or more parameters (such as one or more configurations, configuration parameters, transmission parameters, etc.) along with the information indicative of the uplink resource pool 315 and the set of UEs 115 may perform transmissions via an uplink resource of the uplink resource pool 315 in accordance with (such as based on or using) the one or more parameters. Accordingly, the network entity 105 may effectively provide one or more guidelines for UE self-scheduled transmissions and, generally, may not allow full flexibility for a UE 115 to schedule itself. In accordance with supporting UE self-scheduled transmissions, the UE 115 may refrain from waiting or may otherwise not expect to wait for an individual uplink grant for an uplink transmission. Instead, the UE 115 may transmit via one or more (randomly) selected resources from the uplink resource pool 315.

Additionally, in some implementations, the network entity 105 may indicate, via the control signaling 310, a set of random access resources 320 (such as a PRACH resource set) associated with an uplink timing advance acquisition for UE self-scheduled transmissions. In other words, the network entity 105 may introduce, allocate, configure, or otherwise indicate a PRACH resource set such that the UE 115 may transmit a PRACH in the set to acquire an uplink timing advance before transmitting an uplink data message (e.g., a PUSCH) via an uplink resource in the uplink resource pool 315.

The set of random access resources 320 (e.g., the PRACH resource set) may be separate from CBRA and CFRA random access resources such that the network entity 105 may detect (e.g., uniquely identify from other PRACH resources) a resource from the set of random access resources 320 and determine, identify, ascertain, or otherwise know that the intention of the UE 115 is to acquire an uplink timing advance. For example, the network entity 105 may separately (e.g., independently) indicate, via the control signaling 310, a set of random access resources 325 associated with a connection establishment between the UE 115 and the network entity 105. In other words, the set of random access resources 320 associated with uplink timing advance acquisition for UE self-scheduled transmissions may be separated from (e.g., independent from), and different than, the set of random access resources 325 associated with connection establishment. In accordance with the UE 115 and the network entity 105 using the set of random access resources 320 that is separate/different/independent from the set of random access resources 325, the UE 115 and the network entity 105 may achieve or facilitate faster uplink timing advance acquisition with less signaling by avoiding a full, complete, or entire CBRA procedure to obtain the timing advance. In other words, the set of random access resources 320 (in accordance with being indicated, configured, used, or defined specifically for uplink timing advance acquisition for UE self-scheduled transmissions) may facilitate faster timing advance acquisition with less signaling by causing or (implicitly) indicating the UE 115 and the network entity 105 to not perform an entire CBRA procedure.

In some examples, the set of random access resources 320 may be sequences (such as random access preambles) separated (e.g., defined or indicated separately or independently) from the sequences used for CBRA and CFRA procedures (such as, for example, in a manner consistent with how sequences may be separated between CBRA and CFRA procedures). Additionally, or alternatively, the set of random access resources 320 may be RACH occasions separated (e.g., defined or indicated separately or independently) from the RACH occasions used for CBRA and CFRA procedures. In implementations in which the set of random access resources 320 includes RACH occasions that are defined separately from the RACH occasions used for CBRA and CFRA procedures, the network entity 105 may indicate, via the control signaling 310, a separate (e.g., different or independent) PRACH configuration associated with the set of random access resources 320 as compared to the PRACH configuration associated with random access resources used for CBRA and CFRA procedures.

In some aspects, the PRACH configuration associated with the set of random access resources 320 may include or otherwise be associated with different preamble sets for different cyclic shift step sizes for different timing advance accuracy. For example, the set of random access resources 320 may include a set of random access preambles and the set of random access preambles may include different subsets of random access preambles, each subset of random access preambles being associated with a respective cyclic shift step size. In other words, PRACH preambles of the set of random access resources 320 may be divided into several sets (or subsets) with each set (or subset) having a different cyclic shift step size. In some aspects, each cyclic shift step size may correspond to a different timing advance accuracy.

In such aspects, the UE 115 may select a preamble set (such as a subset of random access preambles of the larger set of random access preamble) depending on a timing advance accuracy and may (subsequently) select (e.g., randomly select) a preamble from the selected preamble set. In examples in which the UE 115 is confident about a current (active) timing advance at the UE 115, the UE 115 may select a preamble set associated with a relatively lower cyclic shift step size, as such a preamble set may be associated with a relatively greater capacity by way of being associated with a relatively lower cyclic shift step size. In other words, a PRACH with a relatively lower cyclic shift step size may help the network allocate a relatively larger quantity of preambles for a given set, thus increasing capacity (as there may be relatively more random access preambles from which UEs 115 may select for a random access message).

In some implementations, the network entity 105 may transmit information indicative of one or more parameters (e.g., instructions) that the UE 115 may use to determine, estimate, or predict a timing advance accuracy (e.g., an accuracy of the current timing advance at the UE 115). In such implementations, the parameters may be associated with a timing advance timer, a serving cell reference signal receive power (RSRP), a neighbor cell RSRP, or a Doppler measurement, among other examples. Accordingly, the UE 115 may determine a confidence level in a current timing advance or a predication of a current timing advance accuracy based on one or more of the timing advance timer, the serving cell RSRP, the neighbor cell RSRP, or the Doppler measurement, among other example parameters or measurements.

In accordance with receiving the control signaling 310 indicating the set of random access resources 320, the UE 115 may transmit a random access message 330 (e.g., a msg1). In some implementations, the UE 115 may transmit the random access message 330 in accordance with a random access resource 320-*a* from the set of random access resources 320. The random access resource 320-*a* may be a RACH occasion or a random access preamble (e.g., a random access sequence), or both, from the set of random access resources 320. In such implementations, a transmission of the random access message 330 in accordance with the random access resource 320-*a* from the set of random access resources 320 may indicate, in accordance with a rule associated with the set of random access resources 320, an intention of the UE 115 to acquire an uplink timing advance for a UE self-scheduled transmission via the uplink resource pool 315. In some implementations, the UE 115 may transmit the random access message 330 in association with applying a current uplink timing advance (which may be an “inaccurate” or not “up-to-date” timing advance) instead of using a (reference) downlink timing. In some other implementations, the UE 115 may transmit the random access message 330 in according with the (reference) downlink timing.

The network entity 105, in accordance with (e.g., after) detecting the random access message 330 (e.g., a PRACH transmission), may estimate an uplink timing advance 340 for the UE 115 and may provide information indicative of the uplink timing advance 340 to the UE 115 via a random access message 335 (e.g., a msg2, such as a special msg2 or a msg2 that is associated with the random access procedure that is specifically associated with providing an uplink timing advance for a UE self-scheduled transmission). In some aspects, the network entity 105 may refrain transmitting further downlink signaling after transmitting the random access message 335 (such that there may be no further downlink signaling within the random access procedure after the random access message 335). In other words, behavior or operation at the network entity 105 may stop at sending the random access message 335 (e.g., the special msg2) including the uplink timing advance 340. In such aspects, the UE 115 may refrain from monitoring for further downlink signaling from the network entity 105 after the random access message 335. For example, the UE 115 may refrain from monitoring for a msg4 from the network entity 105 (and may also refrain from transmitting a msg3).

In some implementations, the random access message 335 may be associated with a format that is associated with (e.g., specific to or based on) the random access message 335 being part of the random access procedure associated with providing an uplink timing advance for a UE self-scheduled transmission. In other words, the random access message 335 may be different from a msg2 of a CBRA procedure as, for example, the random access procedure associated with providing an uplink timing advance for a UE self-scheduled transmission may be absent of a msg3 resource allocation. In some examples, the random access message 335 may provide the uplink timing advance 340 using a preamble identifier (ID) detected from the random access message 330.

For example, the network entity 105 generate the random access message 335 in accordance with a random access (RA) radio network temporary ID (RA-RNTI) or a random access preamble ID (RAPID) that the network entity 105 detects or otherwise obtains in accordance with receiving the random access message 330. For example, during detection of the random access message 330 (e.g., msg1 detection), the network entity 105 may not be aware of a UE ID associated with the UE 115 (as the UE 115 may not maintain an RRC connection with the network entity 105) and may provide the uplink timing advance 340 using the preamble detected via the reception of the random access message 330. The network entity 105 may generate the random access message 335 in accordance with including an indication of an RA-RNTI or a RAPID within the random access message 335 or in accordance with encoding, masking, or scrambling the random access message 335 based on the RA-RNTI or the RAPID, or any combination thereof.

In some examples, the random access message 335 may include the uplink timing advance 340 corresponding to the detected preamble (e.g., corresponding to the random access message 330) and one or more power control parameters for a PUSCH transmission by the UE 115. For example, from the PRACH detection (e.g., detection of the random access message 330), the network entity 105 may determine, identify, measure, or otherwise ascertain a received power level of the random access message 330 and may determine, select, calculate, or otherwise ascertain a power boost or de-boost (e.g., an increment or decrement to a transmit power level at the UE 115) for the PUSCH transmission via an uplink resource from the uplink resource pool 315 (e.g., a PUSCH transmission in the CG-PUSCH resource pool). For example, the random access message 335 may include one or multiple bits of information regarding a transmit power adjustment (e.g., an increase or a decrease on top of, such as relative to, the transmit power used by the UE 115 to transmit the random access message 330) that the UE 115 may (e.g., is expected to) apply for the PUSCH transmission.

The UE 115 may accordingly use the uplink timing advance 340 and, if present, one or more other parameters provided by the random access message 335 for an uplink transmission, such as an uplink data message 345, via an uplink resource 315-*a* from the uplink resource pool 315 (e.g., for an uplink transmission in the CG-PUSCH resource pool). In some examples, the UE 115 may set a transmit power for the uplink data message 345 in accordance with (e.g., based on) a transmit power adjustment received via the random access message 335. In some implementations, the UE 115 may transmit the uplink data message 345 via the uplink resource 315-*a* in accordance with selecting (such as randomly selecting) the uplink resource 315-*a* from the uplink resource pool 315 (e.g., without receiving scheduling information, such as an individual uplink grant, from the network entity 105 for the uplink data message 345).

Figure 4:
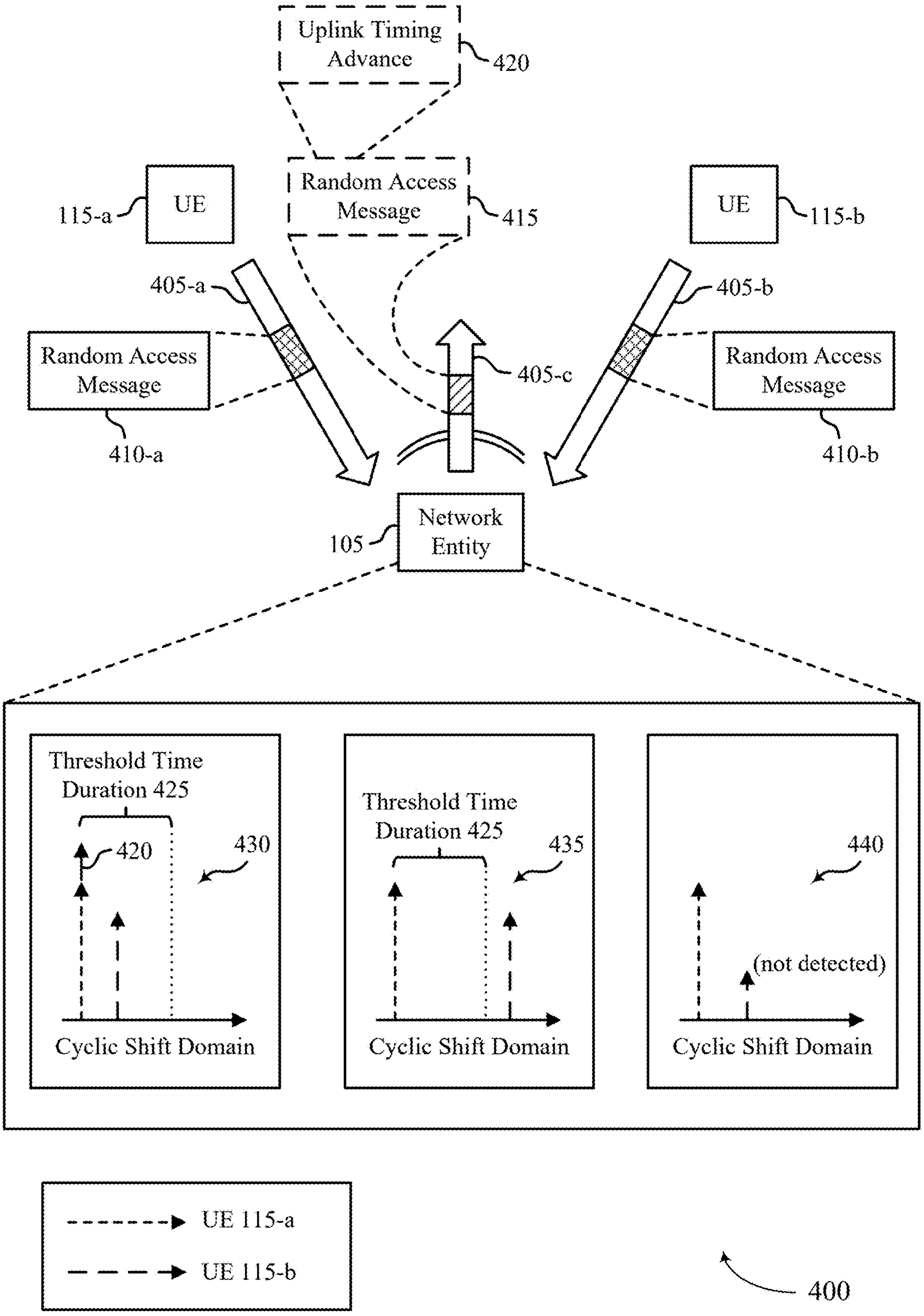

FIG. 4 shows an example signaling diagram 400 that supports UE initiated uplink timing advance acquisition for self-scheduled transmission in accordance with one or more aspects of the present disclosure. The signaling diagram 400 illustrates communication between a UE 115-*a*, a UE 115-*b*, and a network entity 105, each of which may be examples of corresponding devices illustrated and described herein. As illustrated in the example of the signaling diagram 400, the UE 115-*a* may transmit a random access message 410-*a* via a communication link 405-*a* and the UE 115-*b* may transmit a random access message 410-*b* via a communication link 405-*b*. The random access message 410-*a* and the random access message 410-*b* may be examples of a random access message 330 as illustrated by and described with reference to FIG. 3. For example, each of the random access message 410-*a* and the random access message 410-*b* may be in accordance with a random access resource from the set of random access resources 320 associated with uplink timing advance acquisition for UE self-scheduled transmissions.

In accordance with receiving one or both of the random access message 410-*a* and the random access message 410-*b*, the network entity 105 may selectively transmit one or more random access messages 415 including an indication of one or more uplink timing advances 420. The network entity 105 may transmit the one or more random access messages 415 via a communication link 405-*c*, which may be an example of direct communication links to each of the UE 115-*a* and the UE 115-*b* or a broadcast communication link via which the UE 115-*a* and the UE 115-*b* are able to receive signaling from the network entity 105.

In scenarios in which the network entity 105 accurately detects the random access message 410-*a* and the random access message 410-*b* with accurate timing advance detection (such as in scenarios in which the random access message 410-*a* and the random access message 410-*b* are transmitted in accordance with different resources from the set of random access resources 320), the network entity 105 may convey an uplink timing advance 420 to each of the UE 115-*a* and the UE 115-*b*. For example, the network entity 105 may transmit an indication of a first uplink timing advance 420 via a first random access message 415 to the UE 115-*a* and may transmit an indication of a second uplink timing advance 420 via a second random access message 415 to the UE 115-*b* in accordance with the network entity 105 accurately detecting different preambles associated with the random access message 410-*a* and the random access message 410-*b* (or in accordance with the random access message 410-*a* and the random access message 410-*b* being transmitted via different RACH occasions). Due to a sparsity of UE transmissions in some scenarios, a likelihood of collision of random access messages at the network entity 105 may be relatively low.

Alternatively, or additionally, in scenarios in which the network entity 105 fails to detect a preamble (such as fails to detect one or both of the random access message 410-*a* or the random access message 410-*b*), the network entity 105 may refrain from transmitting a random access message 415 including an indication of an uplink timing advance 420. In examples in which the network entity 105 fails to detect the random access message 410-*a* from the UE 115-*a* (and accordingly refrains from transmitting a random access message 415 to the UE 115-*a* indicating an uplink timing advance), the UE 115-*a* may retransmit the random access message 410-*a* (a msg1) with a power ramp in a next PRACH transmission. In some implementations, the UE 115-*a* may determine to retransmit the random access message 410-*a* with a power ramp (e.g., a greater transmit power) in a next PRACH transmission in accordance with failing to receive a random access message 415 (e.g., a msg2, such as a special msg2) from the network entity 105. In some aspects, the UE 115-*a* may determine to retransmit the random access message 410-*a* in accordance with failing to receive a random access message 415 within a threshold time duration of transmitting the random access message 410-*a*.

In scenarios in which there is a collision of msg1 transmissions (in accordance with multiple users, such as the UE 115-*a* and the UE 115-*b* using a same random access preamble (via a same RACH occasion)), one or more of the UE 115-*a*, the UE 115-*b*, or the network entity 105 may employ one or more mechanisms to resolve the collision. In some aspects, the mechanism(s) employed may be associated with a specific scenario or (such as a nature of or one or more characteristics of) the collision, such as a specific scenario of the collision at the network entity 105.

For example, in accordance with a scenario 430, the network entity 105 may detect multiple paths at a timing less than a threshold time duration 425. Such a threshold time duration 425 may be, for example, a time duration associated with a cyclic prefix. In accordance with detecting multiple paths at a timing less than the threshold time duration 425, the network entity 105 may detect (and classify) no collision and may indicate an uplink timing advance 420 via a random access message 415 (e.g., the special msg2). In such implementations, the multiple UEs 115 associated with the multiple paths (e.g., the UE 115-*a* and the UE 115-*b*) may receive and apply the same uplink timing advance 420 for respective uplink transmissions. For example, if the network entity 105 receives the random access message 410-*a* and the random access message 410-*b* within the threshold time duration 425 of each other, the network entity 105 may transmit the uplink timing advance 420 via the random access message 415 and both the UE 115-*a* and the UE 115-*b* may apply the uplink timing advance 420 for their respective uplink data messages. In some aspects, the network entity 105 may "address" the random access message 415 to both the UE 115-*a* and the UE 115-*b* in accordance with generating the random access message 415 in accordance with the random access preamble that was included in both the random access message 410-*a* and the random access message 410-*b*.

In some examples, the network entity 105 may determine, select, measure, or calculate the uplink timing advance 420 based on an earlier detected user. For example, if the network entity 105 receives the random access message 410-*a* prior to the random access message 410-*b*, the network entity 105 may determine, select, measure, or calculate the uplink timing advance 420 based on a timing of the random access message 410-*a*. In such examples, the UE 115-*b* (the later UE) may experience a delay at the network entity 105 and, in accordance with the described techniques, such a delay may be relatively small and may not result in data interference because any potential timing misalignment is less than, for example, a cyclic prefix duration. Further, in accordance with the UE 115-*a* and the UE 115-*b* using the uplink timing advance 420 for self-scheduled transmissions, each of the UE 115-*a* and the UE 115-*b* may select one or more random resources from the uplink resource pool 315 such that a collision in msg1 transmission may not lead to an uplink data collision (due to the randomness in the resource selection from the uplink resource pool 315).

For further example, in accordance with a scenario 435, the network entity 105 may detect multiple paths at a timing difference greater than the threshold time duration 425 (e.g., greater than a time duration associated with a cyclic prefix). In such scenarios in which multiple paths arrive at the network entity 105 at a timing difference greater than the threshold time duration 425, the network entity 105 may detect (and classify) a collision. In some aspects, the network entity 105 may classify the scenario 435 as a collision in accordance with the network entity 105 not being able to differentiate between the UE 115-*a* and the UE 115-*b* (such as between the random access message 410-*a* transmitted by the UE 115-*a* and the random access message 410-*b* transmitted by the UE 115-*b*) and in accordance with an average timing advance allocation potentially resulting in an uplink timing advance error greater than, for example, a cyclic prefix duration (which may lead to uplink data interference). The network entity 105 may refrain from transmitting a random access message 415 (e.g., the special msg2) corresponding to the received random access preamble in accordance with detecting the collision. In such examples, the UE 115-*a* and the UE 115-*b* may perform a PRACH retransmission (e.g., transmit another msg1) in accordance with failing to receive a random access message 415 responsive to the initial transmissions of the random access message 410-*a* and the random access message 410-*b*, respectively.

For further example, in accordance with the scenario 440, the network entity 105 may detect a subset of (colliding) users due to, for example, a signal-to-noise ratio (SNR) difference at the network entity 105. For example, the network entity 105 may detect the random access message 410-*a* and may fail to detect the random access message 410-*b* (due to the random access message 410-*b* being associated with a relatively low SNR or an SNR more than a threshold amount lower than an SNR of the random access message 410-*a*). In such scenarios, the network entity 105 may assume that there is no collision in msg1 transmissions (even if the random access message 410-*a* and the random access message 410-*b* include a same random access preamble) and may transmit a random access message 415 indicating an uplink timing advance 420. The network entity 105 may generate the random access message 415 in accordance with the detected random access preamble, which may be the same preamble used by both the UE 115-*a* and the UE 115-*b*.

Accordingly, both the UE 115-*a* and the UE 115-*b* may receive the random access message 415 and assume that the uplink timing advance 420 indicated by the random access message 415 is intended for itself. Likewise, both the UE 115-*a* and the UE 115-*b* may apply the uplink timing advance 420 indicated by the random access message 415 and transmit an uplink data message in accordance with applying the uplink timing advance 420. In some scenarios, the network entity 105 may detect the uplink transmission by the UE 115-*a* (e.g., the strong SNR user) and may transmit acknowledgment (ACK) feedback to the UE 115-*a* accordingly. The network entity 105, however, may fail to detect the uplink transmission by the UE 115-*b* (e.g., the weak SNR user) in accordance with the transmit power of the UE 115-*b* being too low or in accordance with the UE 115-*b* using an incorrect uplink timing advance. As the UE 115-*b* may be associated with a relatively weak SNR at the network entity 105, the UE 115-*b* may contribute less than a threshold amount of interference to uplink transmissions by other users (e.g., other UEs 115) due to using a potentially incorrect uplink timing advance.

In accordance with being associated with a relatively weak SNR at the network entity 105, data transmissions by the UE 115-*b* may not be detected by the network entity 105. The UE 115-*b* may perform one or more retransmissions of an uplink data message in accordance with failing to receive an ACK from the network entity 105 associated with the uplink data message. In some implementations, in accordance with (e.g., after) performing a threshold quantity of unsuccessful retransmission of the uplink data message, the UE 115-*b* may start or initiate a PRACH procedure with a power ramp. In other words, the UE 115-*b* may employ a mechanism according to which the UE 115-*b* determines, assumes, or ascertains that the random access message 410-*b* was falsely detected (or mis-detected) at the network entity 105 and performs another transmission of a random access message 410-*b* (e.g., fallback to a msg1 transmission step) if an uplink data message (e.g., a CG-PUSCH transmission) is not acknowledged (within a threshold quantity of transmission attempts). The network entity 105 may indicate such a threshold quantity via signaling, such as via control signaling, or such a threshold quantity may be associated with a network specification, or both. Such another transmission of a random access message 410-*b* may include a selection of another or the same random access resource from the set of random access resources 320. The UE 115-*b* may perform such a second transmission of a random access message 410-*b* using a relatively greater transmit power as compared to a transmit power used for the initial transmission of the random access message 410-*b*.

Figure 5:
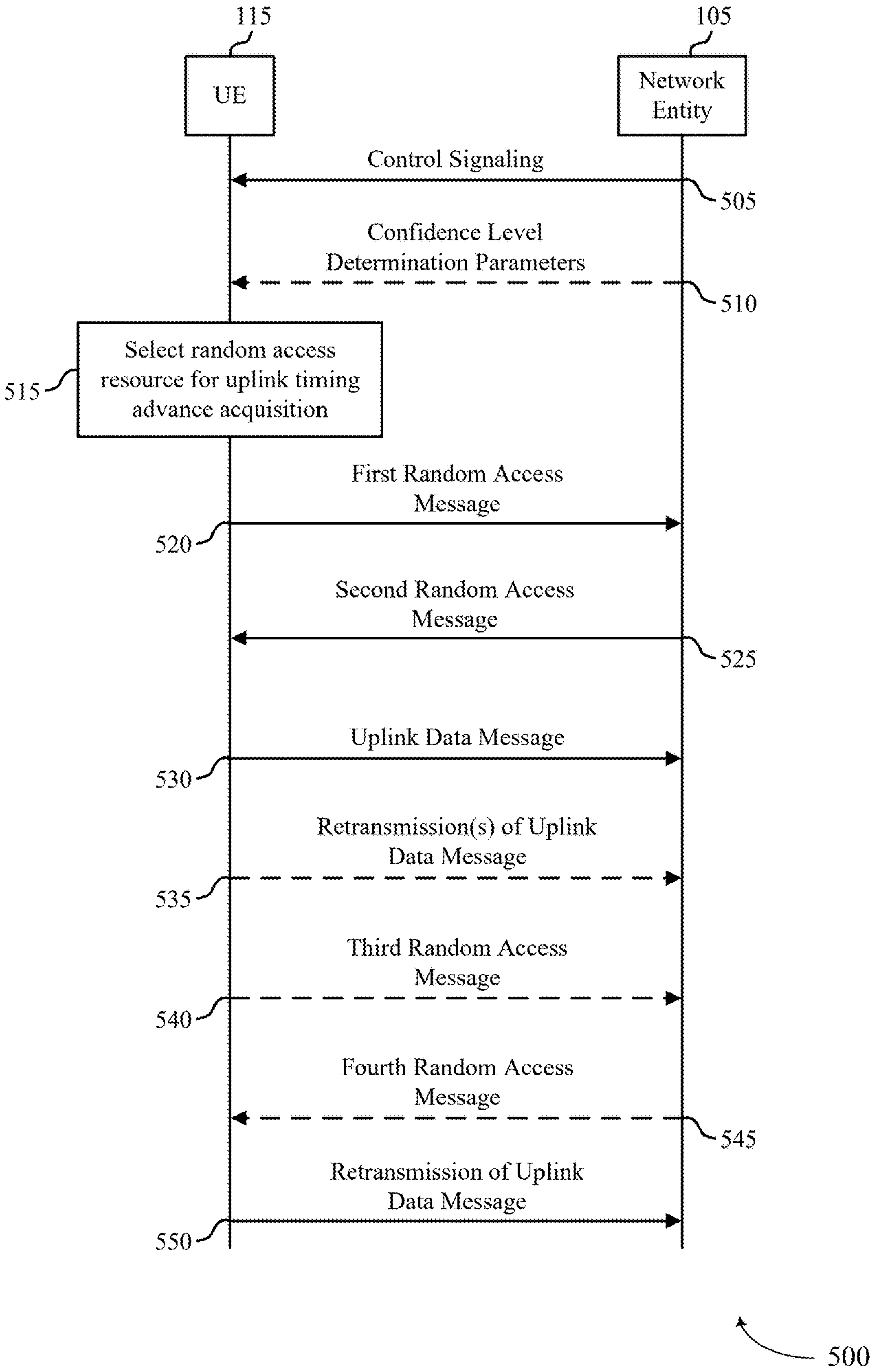
FIG. 5 shows an example of a process flow that supports UE initiated uplink timing advance acquisition for self-scheduled transmission in accordance with one or more aspects of the present disclosure.

FIG. 5 shows an example process flow 500 that supports UE initiated uplink timing advance acquisition for self-scheduled transmission in accordance with one or more aspects of the present disclosure. The process flow 500 illustrates communication between a UE 115 and a network entity 105, each of which may be examples of corresponding devices as illustrated and described herein. In some implementations, the UE 115 and the network entity 105 may employ one or more signaling- or configuration-based mechanisms according to which the UE 115 may explicitly or implicitly indicate an intention of the UE 115 to acquire an uplink timing advance for a UE self-scheduled transmission via a random access message transmission.

Alternative examples of the following may be implemented. Some steps may be performed in a different order than described or may not be performed at all. In some implementations, steps may include additional features not mentioned below, or further steps may be added. Further, although example devices are shown performing the operations of the process flow 500, some aspects of some operations also may be performed by one or more other wireless communication devices without exceeding the scope of the present disclosure. For example, the network entity 105 may perform some aspects of some operations across multiple components, which may be disaggregated or collocated.

At 505, the UE 115 may receive, from the network entity 105, control signaling (e.g., RRC signaling, such as one or more RRC information elements, fields, or parameters) that indicates an uplink resource pool associated with UE self-scheduled transmissions and that indicates a set of random access resources associated with an uplink timing advance acquisition for the UE self-scheduled transmissions. For example, the control signaling may be an example of the control signaling 310 that indicates the uplink resource pool 315 and the set of random access resources 320 as illustrated by and described with reference to FIG. 3. In some examples, the control signaling may further indicate a second set of random access resources associated with a connection establishment between the UE 115 and the network entity 105. Such a second set of random access resources may be an example of the set of random access resources 325 as illustrated by and described with reference to FIG. 3.

The set of random access resources associated with the uplink timing advance acquisition for the UE self-scheduled transmissions may include one or both of RACH occasions or random access preambles that are separate (e.g., independent) from RACH occasions or random access preambles, respectively, of the second set of random access resources associated with the connection establishment. In some implementations, the random access preambles associated with the set of random access resources may be divided into subsets, each subset of random access preambles corresponding to a respective confidence level associated with a current uplink timing advance at the UE 115. In some implementations, each subset of random access preambles may be associated with a respective cyclic shift step size and each respective cyclic shift step size may correspond to a different confidence level at the UE.

At 510, the UE 115 may receive, from the network entity 105, information indicative of one or more parameters according to which the UE 115 may determine a confidence level associated with the current uplink timing advance at the UE 115. The parameters may include one or more of a timing advance timer, a serving cell RSRP, a neighbor cell RSRP, or a Doppler measurement, among other example parameters. In some aspects, the parameters may be associated with a criteria that the UE 115 may use to determine the confidence level associated with the current uplink timing advance at the UE 115. For example, the UE 115 may determine the confidence level associated with the current uplink timing advance at the UE 115 based on whether the timing advance timer associated with the current uplink timing advance is still running (e.g., still valid), based on whether a measured serving cell RSRP satisfies an indicated threshold serving cell RSRP, based on whether a measured neighbor cell RSRP satisfies an indicated threshold neighbor cell RSRP, or based on whether a measured Doppler satisfies an indicated threshold Doppler measurement, among other example criteria. As described herein, satisfying a threshold may include being greater than or equal to the threshold or being less than or equal to the threshold depending on the context.

At 515, the UE 115 may select a random access resource from the set of random access resources associated with uplink timing acquisition for a UE self-scheduled transmission. The UE 115 may (randomly) select the random access resource from a set or a subset of the set of random access resources associated with uplink timing acquisition for a UE self-scheduled transmission. For example, in some implementations, the UE 115 may select a random access preamble from a subset of random access preambles that corresponds to the confidence level of the UE 115 in a current uplink timing advance at the UE 115. Such a selected random access resource may be an example of the random access resource 320-*a* from the set of random access resources 320 as illustrated by and described with reference to FIG. 3.

At 520, the UE 115 may transmit, to the network entity 105, a first random access message (e.g., a msg1) in accordance with the selected random access resource from the set of random access resources associated with the uplink timing advance acquisition for the UE self-scheduled transmissions. Such a first random access message may be an example of the random access message 330 as illustrated by and described with reference to FIG. 3. In some aspects, transmitting the first random access message in accordance with the random access resource from the set of random access resources indicates may indicate (in accordance with a rule associated with the set of random access resources) an intention of the UE 115 to acquire the uplink timing advance for a UE self-scheduled transmission via the uplink resource pool.

At 525, the UE 115 may receive, from the network entity 105 via a second random access message (e.g., a msg2, such as a special msg2), an indication of an uplink timing advance based on the first random access message, such as based on transmitting the first random access message. Such a second random access message and the uplink timing advance may be examples of the random access message 335 and the uplink timing advance 340, respectively, as illustrated by and described with reference to FIG. 3. In some aspects, the second random access message may exclude an uplink grant in accordance with the first random access message being transmitted in accordance with the random access resource from the set of random access resources associated with the uplink timing advance acquisition for the UE self-scheduled transmissions.

At 530, the UE 115 may transmit, to the network entity 105 via an uplink resource from the uplink resource pool associated with the UE self-scheduled transmissions, an uplink data message in accordance with the uplink timing advance. Such an uplink resource may be an example of the uplink resource 315-*a* as illustrated by and described with reference to FIG. 3. Further, such an uplink data message may be an example of the uplink data message 345 as illustrated by and described with reference to FIG. 3.

At 535, the UE 115 may perform one or more retransmissions of the uplink data message in accordance with the uplink timing advance. In some implementations, the UE 115 may perform the one or more retransmissions of the uplink data message based on a failure to receive an ACK associated with the uplink data message from the network entity 105.

At 540, the UE 115 may transmit, to the network entity 105 and based on performing a threshold quantity of retransmissions of the uplink data message, a third random access message (e.g., a msg1) in accordance with a second random access resource from the set of random access resources associated with the uplink timing advance acquisition for the UE self-scheduled transmissions. For example, the UE 115 may determine or assume that the uplink timing advance received via the second random access message is incorrect or inaccurate and may transmit the third random access message in an attempt to receive another uplink timing advance from the network entity 105. Additionally, or alternatively, the UE 115 may determine or assume that the uplink data messages transmitted by the UE 115 are associated with a relatively low SNR at the network entity 105. In some implementations, the UE 115 may transmit the third random access message using a relatively greater transmit power as compared to the first random access message.

At 545, the UE 115 may receive, from the network entity 105 via a fourth random access message (e.g., a msg2, such as a special msg2), an indication of a second uplink timing advance based on transmitting the third random access message. For example, the network entity 105 may provide the second uplink timing advance as a new, updated, or refreshed uplink timing advance as compared to the uplink timing advance indicated by the second random access message. In some aspects, the fourth random access message may exclude an uplink grant in accordance with the third random access message being transmitted in accordance with the second random access resource from the set of random access resources associated with the uplink timing advance acquisition for the UE self-scheduled transmissions.

At 550, the UE 115 may retransmit, to the network entity 105, the uplink data message in accordance with the second uplink timing advance. The UE 115 may retransmit the uplink data message in accordance with selecting an uplink resource from the uplink resource pool associated with the UE self-scheduled transmissions, such as an uplink resource 315-*a* from the uplink resource pool 315 as illustrated by and described with reference to FIG. 3.

Figure 6:
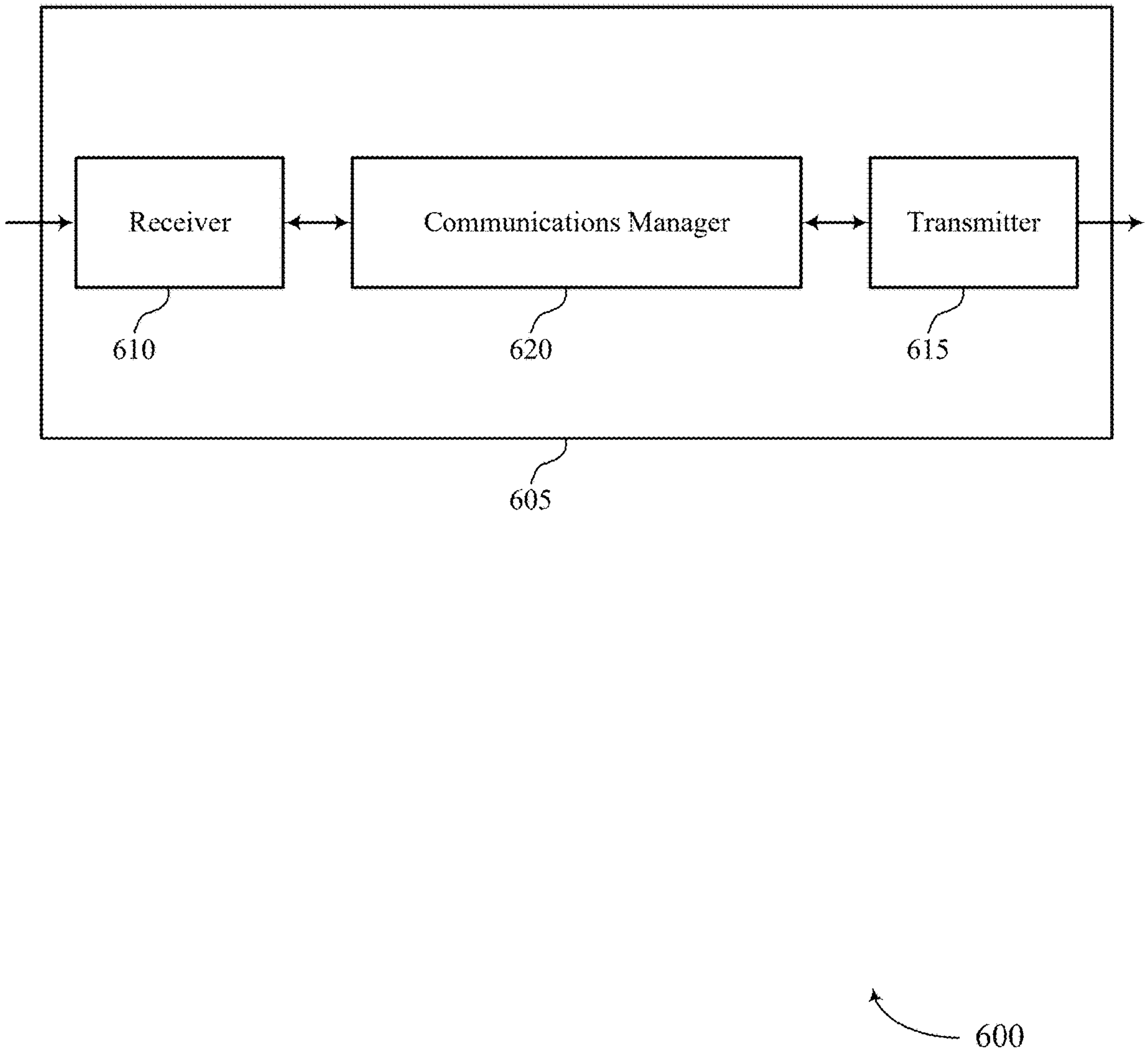
FIGS. 6 and 7 show block diagrams of devices that support UE initiated uplink timing advance acquisition for self-scheduled transmission in accordance with one or more aspects of the present disclosure.

FIG. 6 shows a block diagram 600 of a device 605 that supports UE initiated uplink timing advance acquisition for self-scheduled transmission in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to user equipment initiated uplink timing advance acquisition for self-scheduled transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to user equipment initiated uplink timing advance acquisition for self-scheduled transmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of user equipment initiated uplink timing advance acquisition for self-scheduled transmission as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. For example, the communications manager 620 is capable of, configured to, or operable to support a means for receiving control signaling that indicates an uplink resource pool associated with UE self-scheduled transmissions and that indicates a set of random access resources associated with an uplink timing advance acquisition for the UE self-scheduled transmissions. The communications manager 620 is capable of, configured to, or operable to support a means for transmitting a first random access message in accordance with a random access resource from the set of random access resources associated with the uplink timing advance acquisition for the UE self-scheduled transmissions. The communications manager 620 is capable of, configured to, or operable to support a means for receiving, via a second random access message, an indication of an uplink timing advance based on the first random access message. The communications manager 620 is capable of, configured to, or operable to support a means for transmitting, via an uplink resource from the uplink resource pool associated with the UE self-scheduled transmissions, an uplink data message in accordance with the uplink timing advance.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
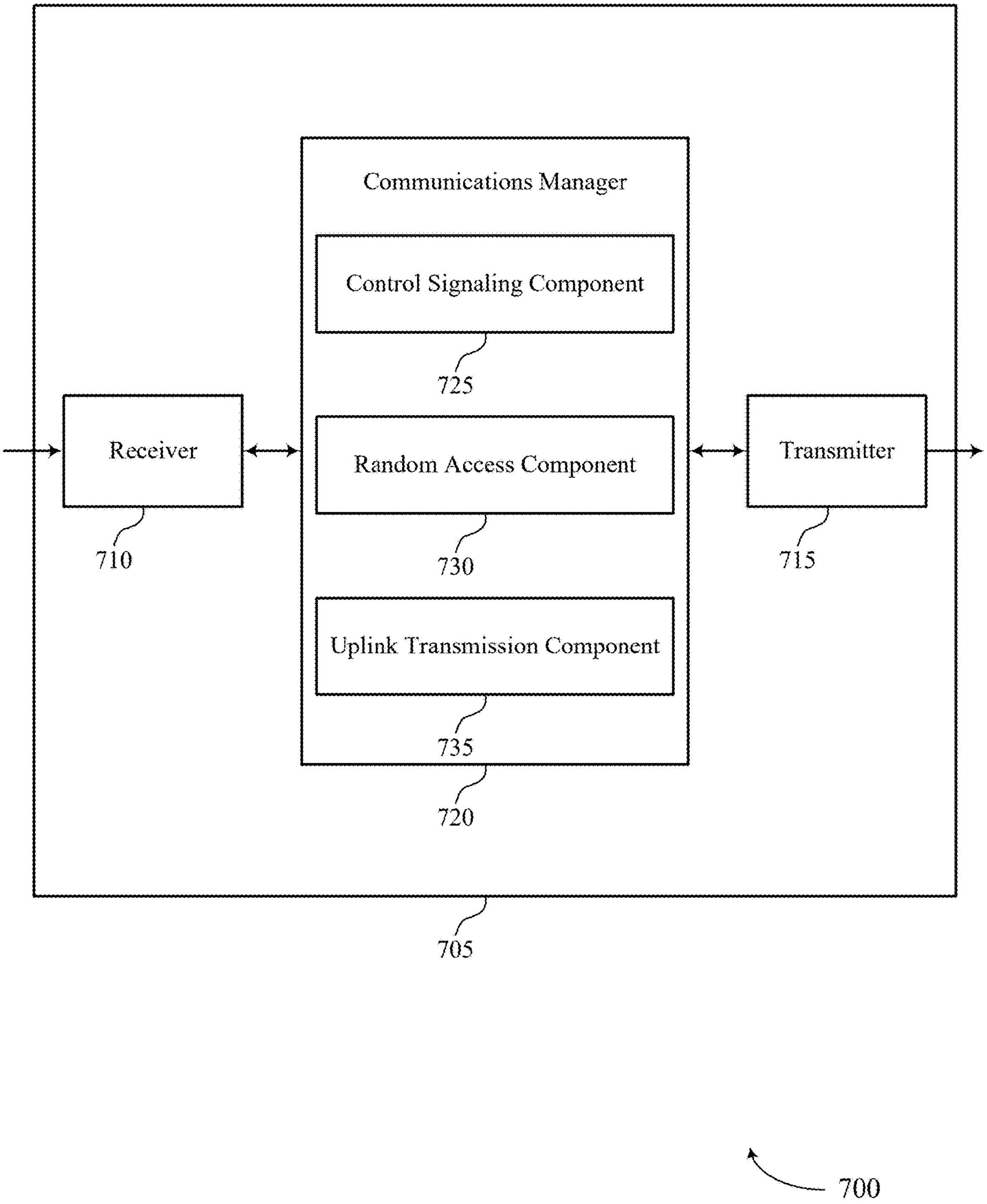

FIG. 7 shows a block diagram 700 of a device 705 that supports user equipment initiated uplink timing advance acquisition for self-scheduled transmission in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to user equipment initiated uplink timing advance acquisition for self-scheduled transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to user equipment initiated uplink timing advance acquisition for self-scheduled transmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of user equipment initiated uplink timing advance acquisition for self-scheduled transmission as described herein. For example, the communications manager 720 may include a control signaling component 725, a random access component 730, an uplink transmission component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. The control signaling component 725 is capable of, configured to, or operable to support a means for receiving control signaling that indicates an uplink resource pool associated with UE self-scheduled transmissions and that indicates a set of random access resources associated with an uplink timing advance acquisition for the UE self-scheduled transmissions. The random access component 730 is capable of, configured to, or operable to support a means for transmitting a first random access message in accordance with a random access resource from the set of random access resources associated with the uplink timing advance acquisition for the UE self-scheduled transmissions. The random access component 730 is capable of, configured to, or operable to support a means for receiving, via a second random access message, an indication of an uplink timing advance based on the first random access message. The uplink transmission component 735 is capable of, configured to, or operable to support a means for transmitting, via an uplink resource from the uplink resource pool associated with the UE self-scheduled transmissions, an uplink data message in accordance with the uplink timing advance.

Figure 8:
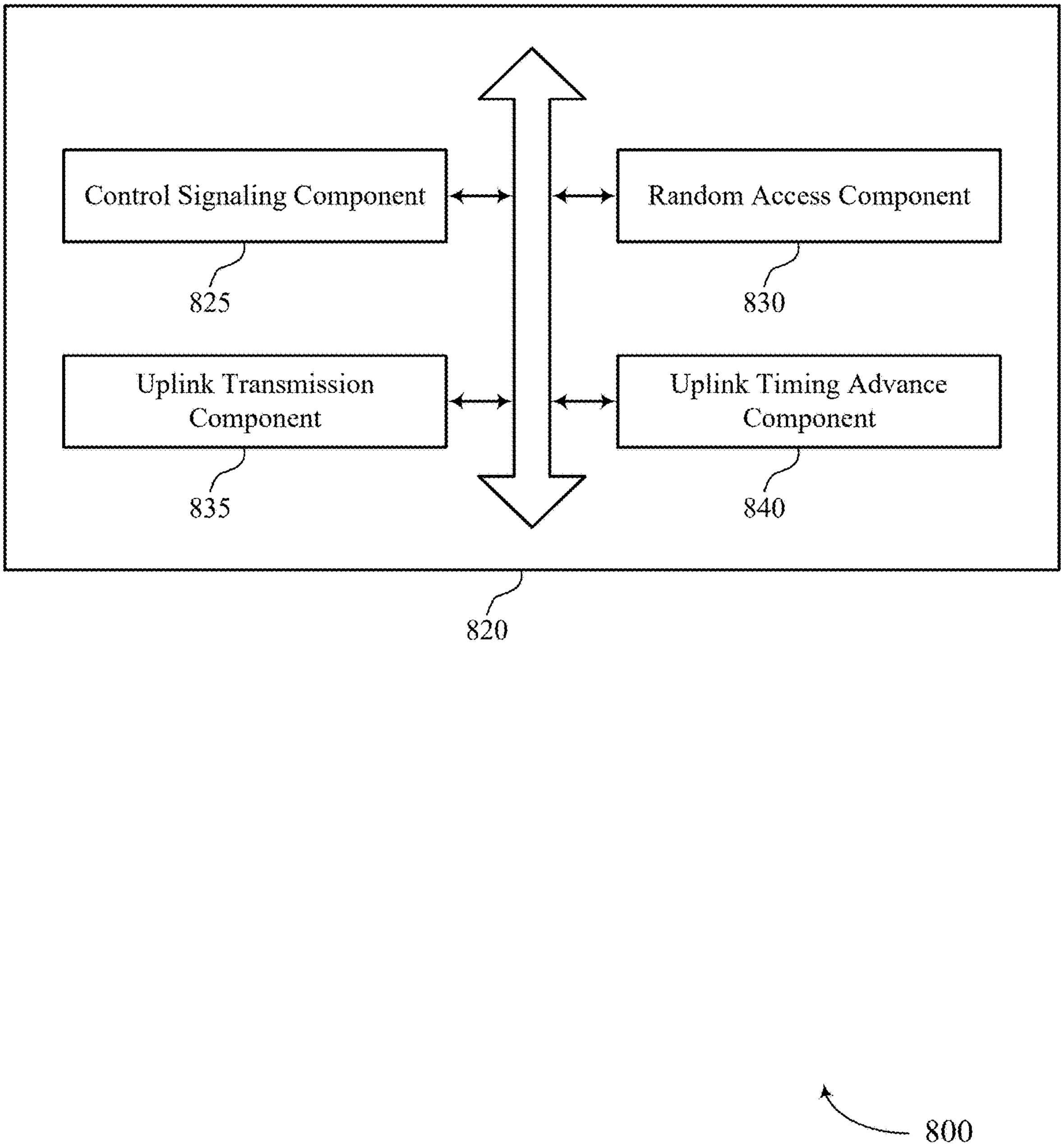
FIG. 8 shows a block diagram of a communications manager that supports UE initiated uplink timing advance acquisition for self-scheduled transmission in accordance with one or more aspects of the present disclosure.

FIG. 8 shows a block diagram 800 of a communications manager 820 that supports user equipment initiated uplink timing advance acquisition for self-scheduled transmission in accordance with one or more aspects of the present disclosure. The communications manager 820 may be an example of aspects of a communications manager 620, a communications manager 720, or both, as described herein. The communications manager 820, or various components thereof, may be an example of means for performing various aspects of user equipment initiated uplink timing advance acquisition for self-scheduled transmission as described herein. For example, the communications manager 820 may include a control signaling component 825, a random access component 830, an uplink transmission component 835, an uplink timing advance component 840, or any combination thereof. Each of these components, or components or subcomponents thereof (e.g., one or more processors, one or more memories), may communicate, directly or indirectly, with one another (e.g., via one or more buses).

The communications manager 820 may support wireless communication in accordance with examples as disclosed herein. The control signaling component 825 is capable of, configured to, or operable to support a means for receiving control signaling that indicates an uplink resource pool associated with UE self-scheduled transmissions and that indicates a set of random access resources associated with an uplink timing advance acquisition for the UE self-scheduled transmissions. The random access component 830 is capable of, configured to, or operable to support a means for transmitting a first random access message in accordance with a random access resource from the set of random access resources associated with the uplink timing advance acquisition for the UE self-scheduled transmissions. In some examples, the random access component 830 is capable of, configured to, or operable to support a means for receiving, via a second random access message, an indication of an uplink timing advance based on the first random access message. The uplink transmission component 835 is capable of, configured to, or operable to support a means for transmitting, via an uplink resource from the uplink resource pool associated with the UE self-scheduled transmissions, an uplink data message in accordance with the uplink timing advance.

In some examples, the control signaling component 825 is capable of, configured to, or operable to support a means for receiving, via the control signaling, information indicative of a second set of random access resources associated with a connection establishment between the UE and a network entity, where the second set of random access resources associated with the connection establishment is independent of the set of random access resources associated with the uplink timing advance acquisition for the UE self-scheduled transmissions.

In some examples, the control signaling component 825 is capable of, configured to, or operable to support a means for receiving, via the control signaling, information indicative of a set of random access channel occasions associated with the uplink timing advance acquisition for the UE self-scheduled transmissions, where the set of random access resources includes the set of random access channel occasions, and where the first random access message is transmitted via a random access channel occasion from the set of random access channel occasions.

In some examples, the control signaling component 825 is capable of, configured to, or operable to support a means for receiving, via the control signaling, information indicative of a set of random access preambles associated with the uplink timing advance acquisition for the UE self-scheduled transmissions, where the set of random access resources includes the set of random access preambles, and where the first random access message includes a random access preamble from the set of random access preambles.

In some examples, the set of random access preambles includes a set of multiple subsets of random access preambles. In some examples, each subset of random access preambles from the set of multiple subsets of random access preambles corresponds to a respective confidence level associated with a current uplink timing advance at the UE.

In some examples, each subset of random access preambles from the set of multiple subsets of random access preambles is associated with a respective cyclic shift step size of a set of multiple cyclic shift step sizes, each respective cyclic shift step size corresponding to a different confidence level at the UE.

In some examples, the random access component 830 is capable of, configured to, or operable to support a means for selecting the random access preamble from a first subset of random access preambles in accordance with the UE having a first confidence level associated with the current uplink timing advance at the UE, where the first subset of random access preambles corresponds to the first confidence level. In some examples, the random access component 830 is capable of, configured to, or operable to support a means for transmitting the first random access message including the random access preamble in accordance with the current uplink timing advance at the UE, where the indication of the uplink timing advance is a relative value with respect to the current uplink timing advance used to transmit the first random access message.

In some examples, the uplink timing advance component 840 is capable of, configured to, or operable to support a means for receiving information indicative of one or more parameters according to which the UE determines a confidence level associated with the current uplink timing advance, where the UE determines a confidence level in accordance with the one or more parameters.

In some examples, transmitting the first random access message in accordance with the random access resource from the set of random access resources indicates, in accordance with a rule associated with the set of random access resources, an intention of the UE to acquire the uplink timing advance for a UE self-scheduled transmission via the uplink resource pool.

In some examples, the second random access message excludes an uplink grant in accordance with the first random access message being transmitted in accordance with the random access resource from the set of random access resources associated with the uplink timing advance acquisition for the UE self-scheduled transmissions.

In some examples, the first random access message includes a msg1, the second random access message includes a msg2, and the UE refrains from monitoring for a msg4 based on one or both of the msg2 excluding an uplink grant for a msg3 or the msg1 being transmitted in accordance with the random access resource from the set of random access resources associated with the uplink timing advance acquisition for the UE self-scheduled transmissions.

In some examples, the uplink transmission component 835 is capable of, configured to, or operable to support a means for retransmitting the uplink data message in accordance with the uplink timing advance based on a failure to receive an acknowledgment associated with the uplink data message. In some examples, the random access component 830 is capable of, configured to, or operable to support a means for transmitting, based on performing a threshold quantity of retransmissions of the uplink data message, a third random access message in accordance with a second random access resource from the set of random access resources associated with the uplink timing advance acquisition for the UE self-scheduled transmissions. In some examples, the random access component 830 is capable of, configured to, or operable to support a means for receiving, via a fourth random access message, an indication of a second uplink timing advance based on transmitting the third random access message. In some examples, the uplink transmission component 835 is capable of, configured to, or operable to support a means for retransmitting the uplink data message in accordance with the second uplink timing advance.

In some examples, the third random access message is transmitted with a greater transmit power than the first random access message.

Figure 9:
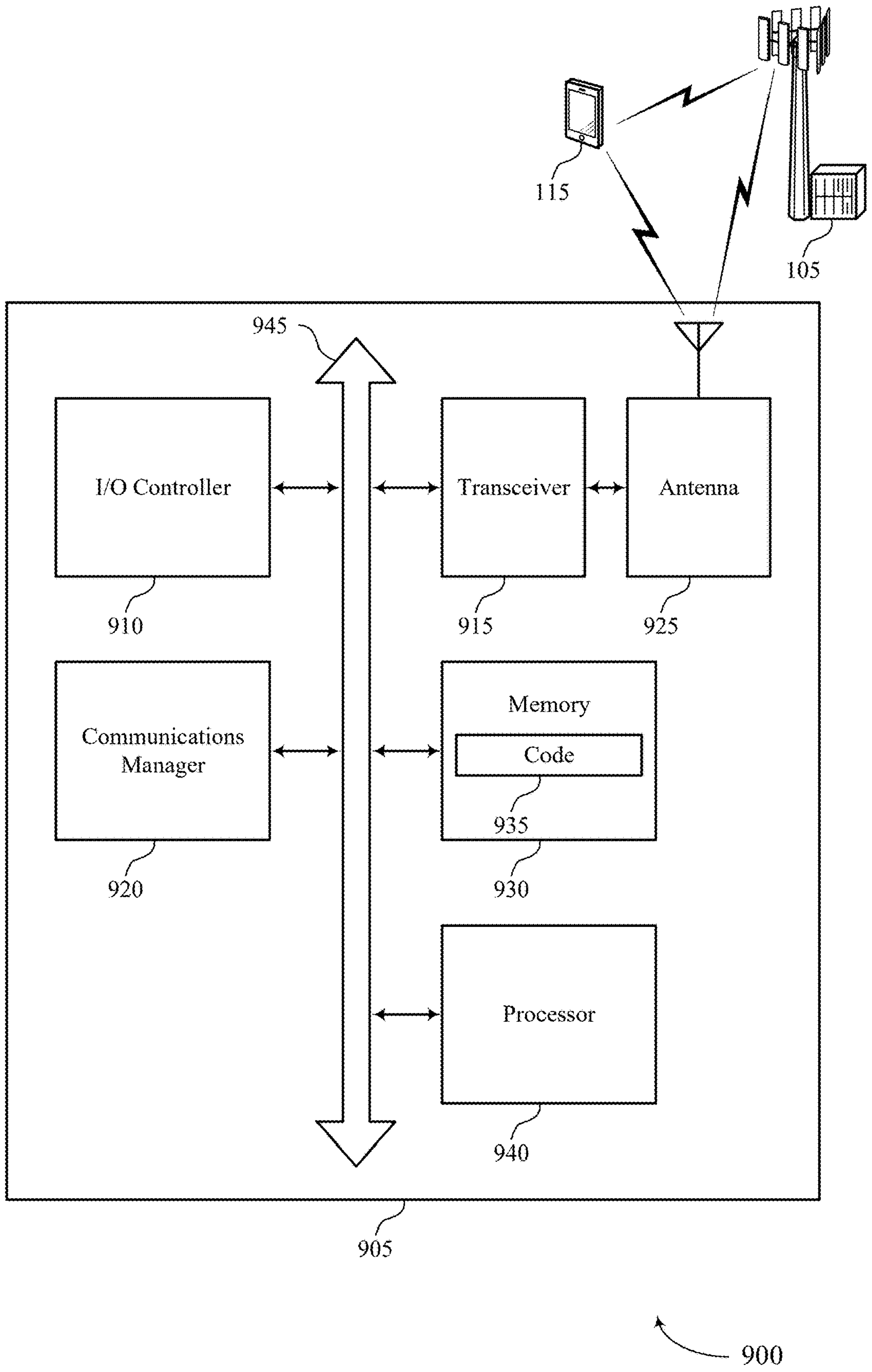
FIG. 9 shows a diagram of a system including a device that supports UE initiated uplink timing advance acquisition for self-scheduled transmission in accordance with one or more aspects of the present disclosure.

FIG. 9 shows a diagram of a system 900 including a device 905 that supports user equipment initiated uplink timing advance acquisition for self-scheduled transmission in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting user equipment initiated uplink timing advance acquisition for self-scheduled transmission). For example, the device 905 or a component of the device 905 may include at least one processor 940 and at least one memory 930 coupled with or to the at least one processor 940, the at least one processor 940 and the at least one memory 930 configured to perform various functions described herein.

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communication in accordance with examples as disclosed herein. For example, the communications manager 920 is capable of, configured to, or operable to support a means for receiving control signaling that indicates an uplink resource pool associated with UE self-scheduled transmissions and that indicates a set of random access resources associated with an uplink timing advance acquisition for the UE self-scheduled transmissions. The communications manager 920 is capable of, configured to, or operable to support a means for transmitting a first random access message in accordance with a random access resource from the set of random access resources associated with the uplink timing advance acquisition for the UE self-scheduled transmissions. The communications manager 920 is capable of, configured to, or operable to support a means for receiving, via a second random access message, an indication of an uplink timing advance based on the first random access message. The communications manager 920 is capable of, configured to, or operable to support a means for transmitting, via an uplink resource from the uplink resource pool associated with the UE self-scheduled transmissions, an uplink data message in accordance with the uplink timing advance.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of user equipment initiated uplink timing advance acquisition for self-scheduled transmission as described herein, or the at least one processor 940 and the at least one memory 930 may be otherwise configured to, individually or collectively, perform or support such operations.

Figure 10:
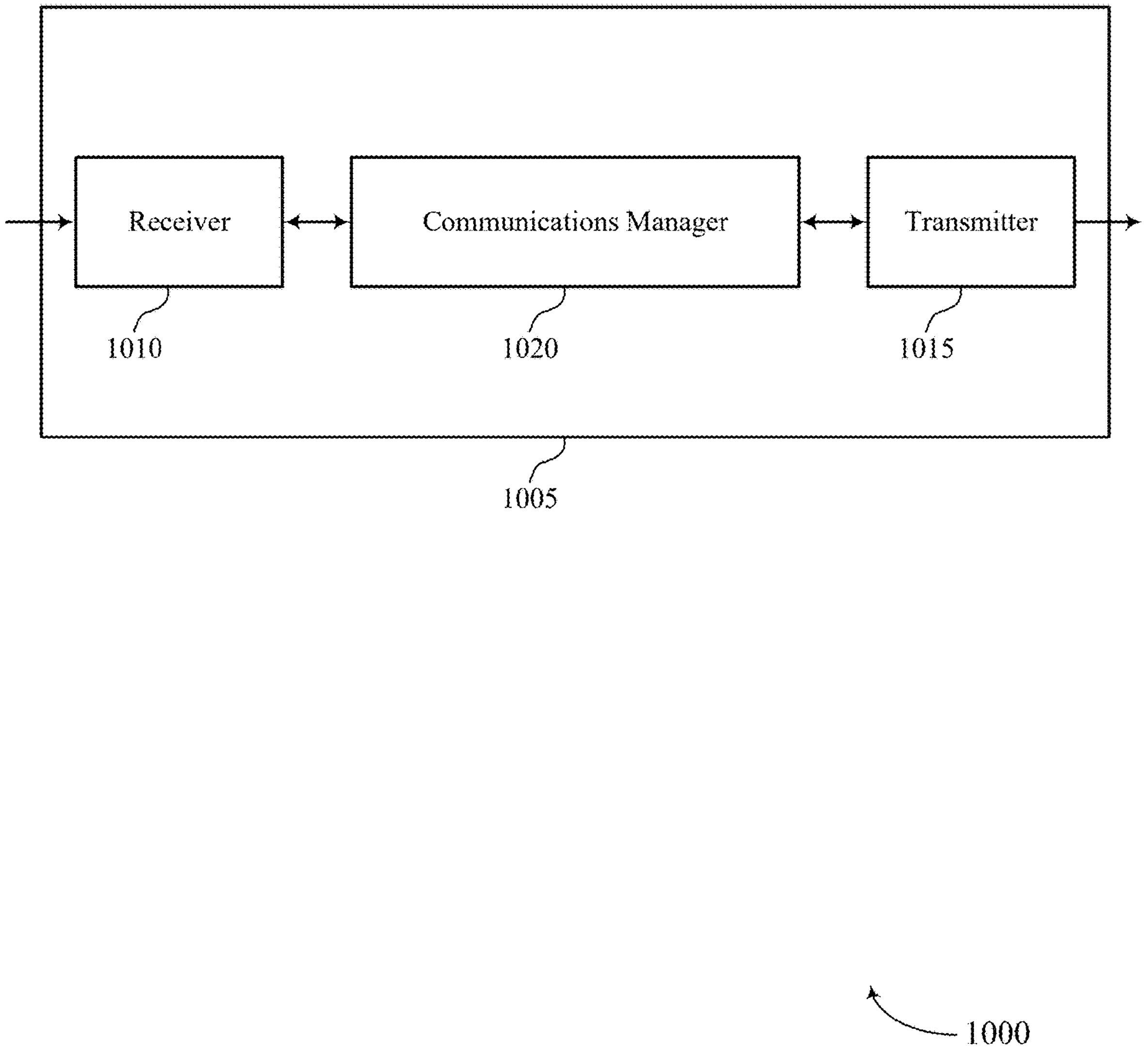
FIGS. 10 and 11 show block diagrams of devices that support UE initiated uplink timing advance acquisition for self-scheduled transmission in accordance with one or more aspects of the present disclosure.

FIG. 10 shows a block diagram 1000 of a device 1005 that supports user equipment initiated uplink timing advance acquisition for self-scheduled transmission in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of user equipment initiated uplink timing advance acquisition for self-scheduled transmission as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. For example, the communications manager 1020 is capable of, configured to, or operable to support a means for outputting control signaling that indicates an uplink resource pool associated with UE self-scheduled transmissions and that indicates a set of random access resources associated with an uplink timing advance acquisition for the UE self-scheduled transmissions. The communications manager 1020 is capable of, configured to, or operable to support a means for obtaining a first random access message in accordance with a random access resource from the set of random access resources associated with the uplink timing advance acquisition for the UE self-scheduled transmissions. The communications manager 1020 is capable of, configured to, or operable to support a means for outputting, via a second random access message, an indication of an uplink timing advance based on the first random access message. The communications manager 1020 is capable of, configured to, or operable to support a means for obtaining, via an uplink resource from the uplink resource pool associated with the UE self-scheduled transmissions, an uplink data message in accordance with the uplink timing advance.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
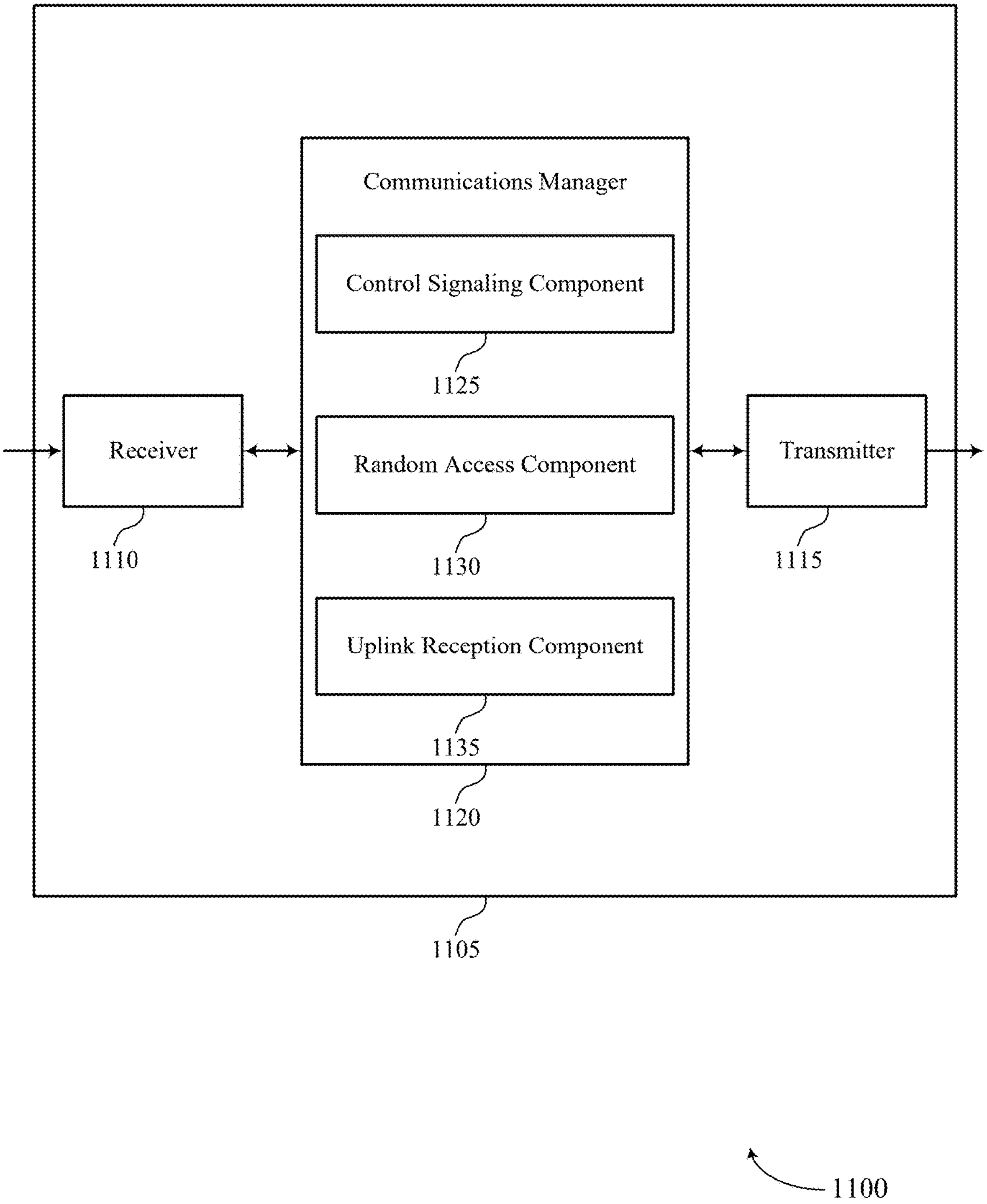

FIG. 11 shows a block diagram 1100 of a device 1105 that supports user equipment initiated uplink timing advance acquisition for self-scheduled transmission in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of user equipment initiated uplink timing advance acquisition for self-scheduled transmission as described herein. For example, the communications manager 1120 may include a control signaling component 1125, a random access component 1130, an uplink reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. The control signaling component 1125 is capable of, configured to, or operable to support a means for outputting control signaling that indicates an uplink resource pool associated with UE self-scheduled transmissions and that indicates a set of random access resources associated with an uplink timing advance acquisition for the UE self-scheduled transmissions. The random access component 1130 is capable of, configured to, or operable to support a means for obtaining a first random access message in accordance with a random access resource from the set of random access resources associated with the uplink timing advance acquisition for the UE self-scheduled transmissions. The random access component 1130 is capable of, configured to, or operable to support a means for outputting, via a second random access message, an indication of an uplink timing advance based on the first random access message. The uplink reception component 1135 is capable of, configured to, or operable to support a means for obtaining, via an uplink resource from the uplink resource pool associated with the UE self-scheduled transmissions, an uplink data message in accordance with the uplink timing advance.

Figure 12:
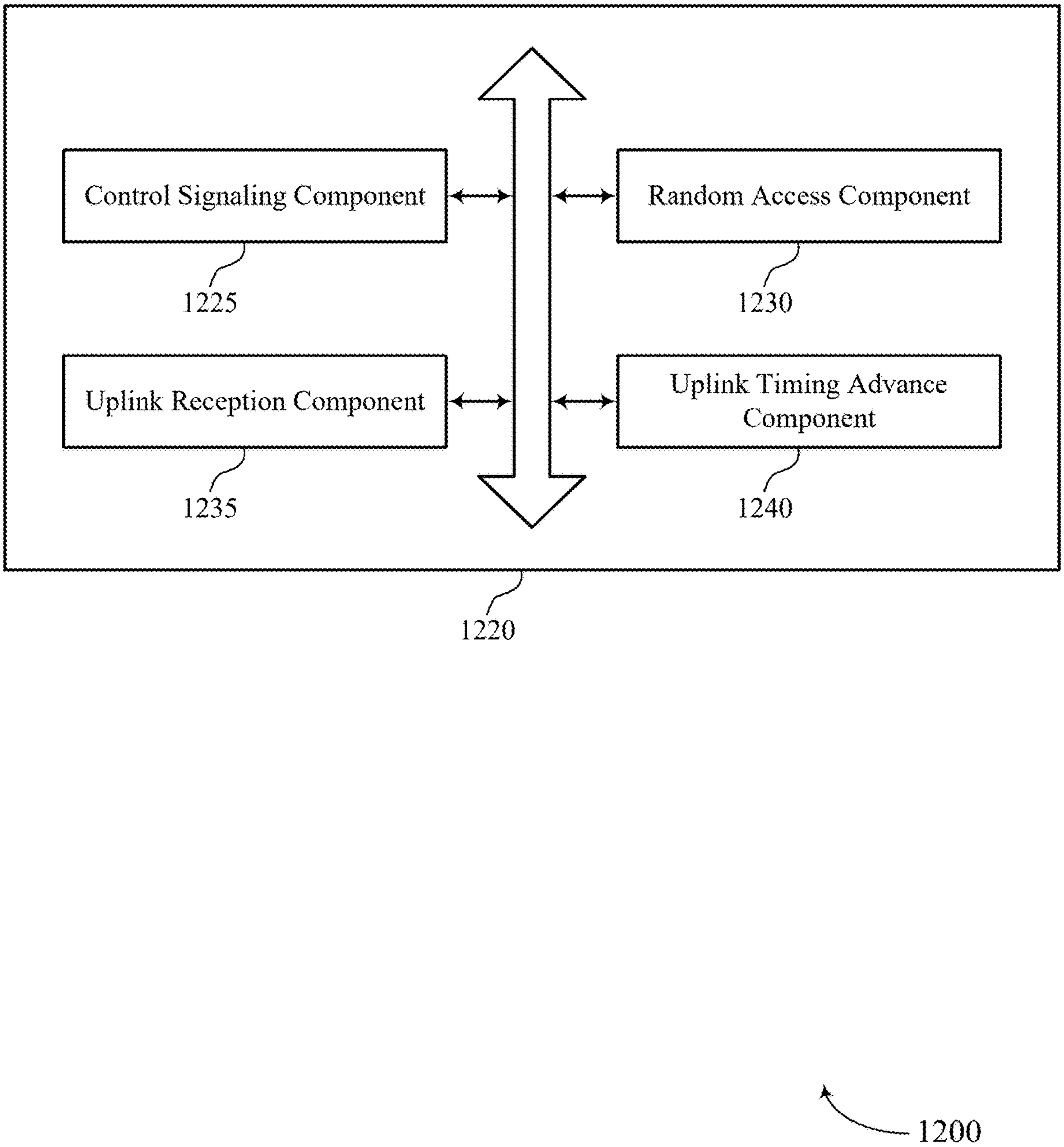
FIG. 12 shows a block diagram of a communications manager that supports UE initiated uplink timing advance acquisition for self-scheduled transmission in accordance with one or more aspects of the present disclosure.

FIG. 12 shows a block diagram 1200 of a communications manager 1220 that supports user equipment initiated uplink timing advance acquisition for self-scheduled transmission in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of user equipment initiated uplink timing advance acquisition for self-scheduled transmission as described herein. For example, the communications manager 1220 may include a control signaling component 1225, a random access component 1230, an uplink reception component 1235, an uplink timing advance component 1240, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication in accordance with examples as disclosed herein. The control signaling component 1225 is capable of, configured to, or operable to support a means for outputting control signaling that indicates an uplink resource pool associated with UE self-scheduled transmissions and that indicates a set of random access resources associated with an uplink timing advance acquisition for the UE self-scheduled transmissions. The random access component 1230 is capable of, configured to, or operable to support a means for obtaining a first random access message in accordance with a random access resource from the set of random access resources associated with the uplink timing advance acquisition for the UE self-scheduled transmissions. In some examples, the random access component 1230 is capable of, configured to, or operable to support a means for outputting, via a second random access message, an indication of an uplink timing advance based on the first random access message. The uplink reception component 1235 is capable of, configured to, or operable to support a means for obtaining, via an uplink resource from the uplink resource pool associated with the UE self-scheduled transmissions, an uplink data message in accordance with the uplink timing advance.

In some examples, the control signaling component 1225 is capable of, configured to, or operable to support a means for outputting, via the control signaling, information indicative of a second set of random access resources associated with a connection establishment between a UE and the network entity, where the second set of random access resources associated with the connection establishment is independent of the set of random access resources associated with the uplink timing advance acquisition for the UE self-scheduled transmissions.

In some examples, the control signaling component 1225 is capable of, configured to, or operable to support a means for outputting, via the control signaling, information indicative of a set of random access channel occasions associated with the uplink timing advance acquisition for the UE self-scheduled transmissions, where the set of random access resources includes the set of random access channel occasions, and where the first random access message is output via a random access channel occasion from the set of random access channel occasions.

In some examples, the control signaling component 1225 is capable of, configured to, or operable to support a means for outputting, via the control signaling, information indicative of a set of random access preambles associated with the uplink timing advance acquisition for the UE self-scheduled transmissions, where the set of random access resources includes the set of random access preambles, and where the first random access message includes a random access preamble from the set of random access preambles.

In some examples, the set of random access preambles includes a set of multiple subsets of random access preambles. In some examples, each subset of random access preambles from the set of multiple subsets of random access preambles corresponds to a respective confidence level associated with a current uplink timing advance at a UE.

In some examples, each subset of random access preambles from the set of multiple subsets of random access preambles is associated with a respective cyclic shift step size of a set of multiple cyclic shift step sizes, each respective cyclic shift step size corresponding to a different confidence level at the UE.

In some examples, the random access component 1230 is capable of, configured to, or operable to support a means for obtaining the first random access message including the random access preamble from a first subset of random access preambles in accordance with the UE having a first confidence level associated with the current uplink timing advance at the UE, where the first subset of random access preambles corresponds to the first confidence level, and where the first random access message is obtained in accordance with the current uplink timing advance at the UE. In some examples, the uplink timing advance component 1240 is capable of, configured to, or operable to support a means for outputting the indication of the uplink timing advance as a relative value with respect to the current uplink timing advance.

In some examples, the uplink timing advance component 1240 is capable of, configured to, or operable to support a means for outputting information indicative of one or more parameters according to which the UE determines a confidence level associated with the current uplink timing advance, where obtaining the first random access message including the random access preamble is in accordance with the one or more parameters.

In some examples, obtaining the first random access message in accordance with the random access resource from the set of random access resources indicates, in accordance with a rule associated with the set of random access resources, an intention of a UE to acquire the uplink timing advance for a UE self-scheduled transmission via the uplink resource pool.

In some examples, the second random access message excludes an uplink grant in accordance with the first random access message being output in accordance with the random access resource from the set of random access resources associated with the uplink timing advance acquisition for the UE self-scheduled transmissions.

In some examples, the first random access message includes a msg1, the second random access message includes a msg2, and the network entity refrains from outputting a msg4 based on one or both of the msg2 excluding an uplink grant for a msg3 or the msg1 being obtained in accordance with the random access resource from the set of random access resources associated with the uplink timing advance acquisition for the UE self-scheduled transmissions.

In some examples, the random access component 1230 is capable of, configured to, or operable to support a means for obtaining a third random access message in accordance with the random access resource from the set of random access resources associated with the uplink timing advance acquisition for the UE self-scheduled transmissions, the first random access message and the third random access message including a same random access preamble. In some examples, the random access component 1230 is capable of, configured to, or operable to support a means for determining that a first received path corresponding to the third random access message is detected within a threshold time duration of a second received path corresponding to the first random access message. In some examples, the random access component 1230 is capable of, configured to, or operable to support a means for generating the second random access message in accordance with identifying information associated with both the first random access message and the third random access message based on determining that the first received path corresponding to the third random access message is detected within the threshold time duration of the second received path corresponding to the first random access message.

In some examples, the threshold time duration includes a cyclic prefix duration.

In some examples, the identifying information is based on the same random access preamble included by both the first random access message and the third random access message.

In some examples, the random access component 1230 is capable of, configured to, or operable to support a means for obtaining a third random access message in accordance with a second random access resource from the set of random access resources associated with the uplink timing advance acquisition for the UE self-scheduled transmissions. In some examples, the random access component 1230 is capable of, configured to, or operable to support a means for obtaining a fourth random access message in accordance with the second random access resource from the set of random access resources associated with the uplink timing advance acquisition for the UE self-scheduled transmissions, the third random access message and the fourth random access message including a same random access preamble. In some examples, the random access component 1230 is capable of, configured to, or operable to support a means for determining that a first received path corresponding to the fourth random access message is detected more than a threshold time duration after a second received path corresponding to the third random access message. In some examples, the uplink timing advance component 1240 is capable of, configured to, or operable to support a means for refraining from outputting an indication of a second uplink timing advance associated with either the third random access message or the fourth random access message based on determining that the first received path corresponding to the fourth random access message is detected more than the threshold time duration after the second received path corresponding to the third random access message.

In some examples, the threshold time duration includes a cyclic prefix duration.

Figure 13:
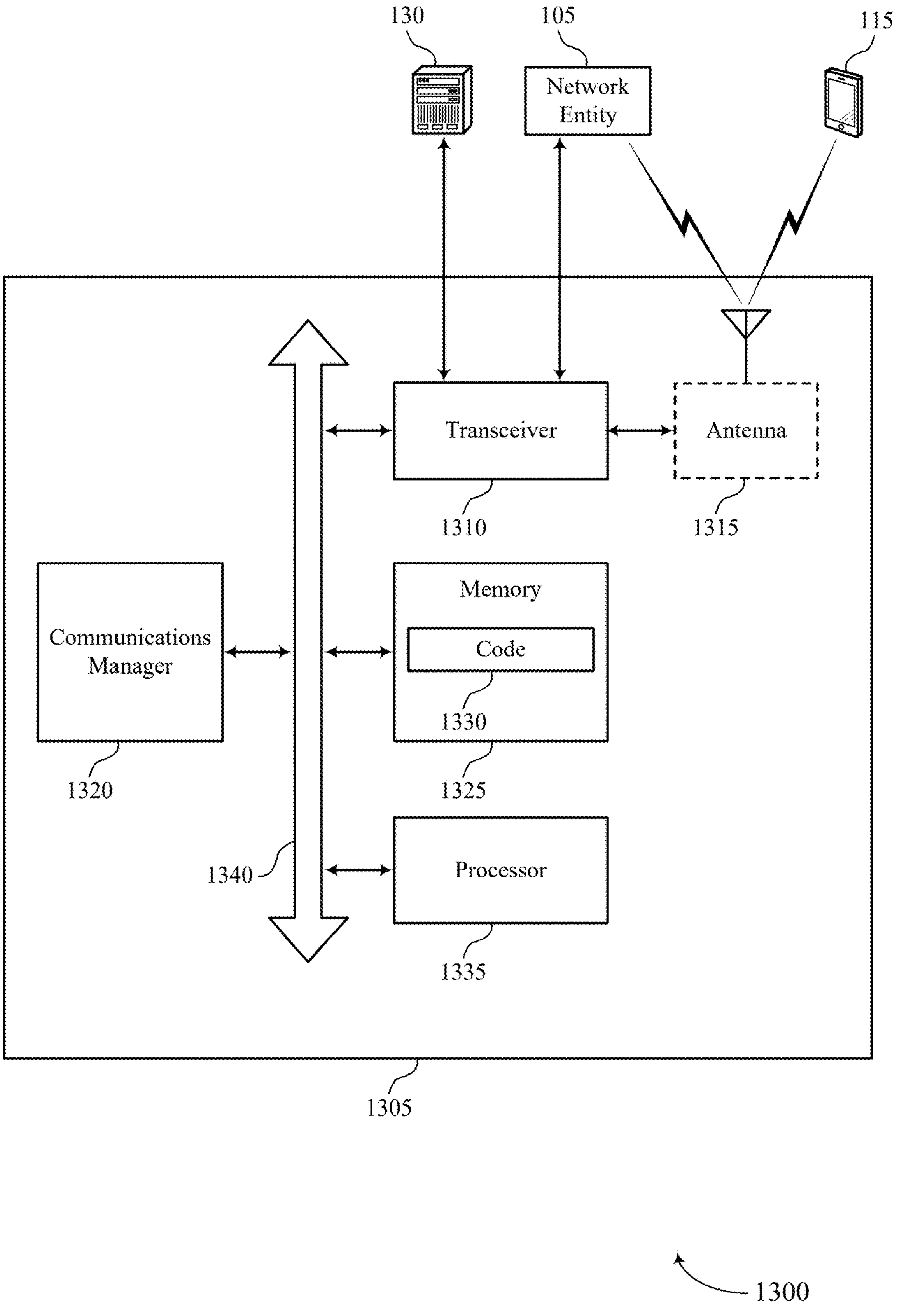
FIG. 13 shows a diagram of a system including a device that supports UE initiated uplink timing advance acquisition for self-scheduled transmission in accordance with one or more aspects of the present disclosure.

FIG. 13 shows a diagram of a system 1300 including a device 1305 that supports user equipment initiated uplink timing advance acquisition for self-scheduled transmission in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more CPUs, one or more GPUs, one or more NPUs (also referred to as neural network processors or DLPs), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting user equipment initiated uplink timing advance acquisition for self-scheduled transmission). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325).

In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communication in accordance with examples as disclosed herein. For example, the communications manager 1320 is capable of, configured to, or operable to support a means for outputting control signaling that indicates an uplink resource pool associated with UE self-scheduled transmissions and that indicates a set of random access resources associated with an uplink timing advance acquisition for the UE self-scheduled transmissions. The communications manager 1320 is capable of, configured to, or operable to support a means for obtaining a first random access message in accordance with a random access resource from the set of random access resources associated with the uplink timing advance acquisition for the UE self-scheduled transmissions. The communications manager 1320 is capable of, configured to, or operable to support a means for outputting, via a second random access message, an indication of an uplink timing advance based on the first random access message. The communications manager 1320 is capable of, configured to, or operable to support a means for obtaining, via an uplink resource from the uplink resource pool associated with the UE self-scheduled transmissions, an uplink data message in accordance with the uplink timing advance.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of user equipment initiated uplink timing advance acquisition for self-scheduled transmission as described herein, or the at least one processor 1335 and the at least one memory 1325 may be otherwise configured to, individually or collectively, perform or support such operations.

Figure 14:
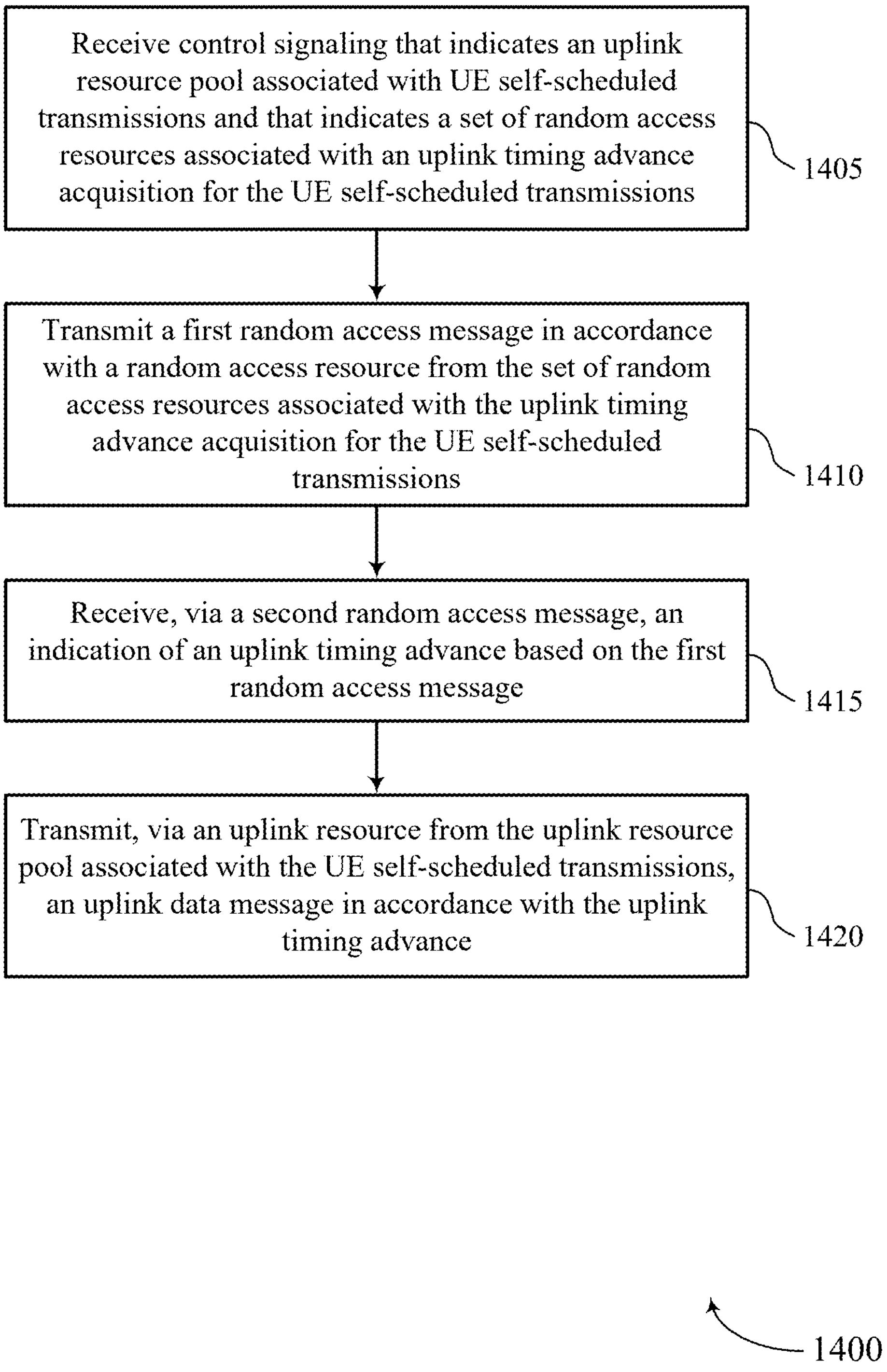
FIGS. 14 through 17 show flowcharts illustrating methods that support UE initiated uplink timing advance acquisition for self-scheduled transmission in accordance with one or more aspects of the present disclosure.

FIG. 14 shows a flowchart illustrating a method 1400 that supports user equipment initiated uplink timing advance acquisition for self-scheduled transmission in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that indicates an uplink resource pool associated with UE self-scheduled transmissions and that indicates a set of random access resources associated with an uplink timing advance acquisition for the UE self-scheduled transmissions. The operations of 1405 may be performed in accordance with examples as disclosed herein. In some examples, aspects of the operations of 1405 may be performed by a control signaling component 825 as described with reference to FIG. 8.

At 1410, the method may include transmitting a first random access message in accordance with a random access resource from the set of random access resources associated with the uplink timing advance acquisition for the UE self-scheduled transmissions. The operations of 1410 may be performed in accordance with examples as disclosed herein. In some examples, aspects of the operations of 1410 may be performed by a random access component 830 as described with reference to FIG. 8.

At 1415, the method may include receiving, via a second random access message, an indication of an uplink timing advance based on the first random access message. The operations of 1415 may be performed in accordance with examples as disclosed herein. In some examples, aspects of the operations of 1415 may be performed by a random access component 830 as described with reference to FIG. 8.

At 1420, the method may include transmitting, via an uplink resource from the uplink resource pool associated with the UE self-scheduled transmissions, an uplink data message in accordance with the uplink timing advance. The operations of 1420 may be performed in accordance with examples as disclosed herein. In some examples, aspects of the operations of 1420 may be performed by an uplink transmission component 835 as described with reference to FIG. 8.

Figure 15:
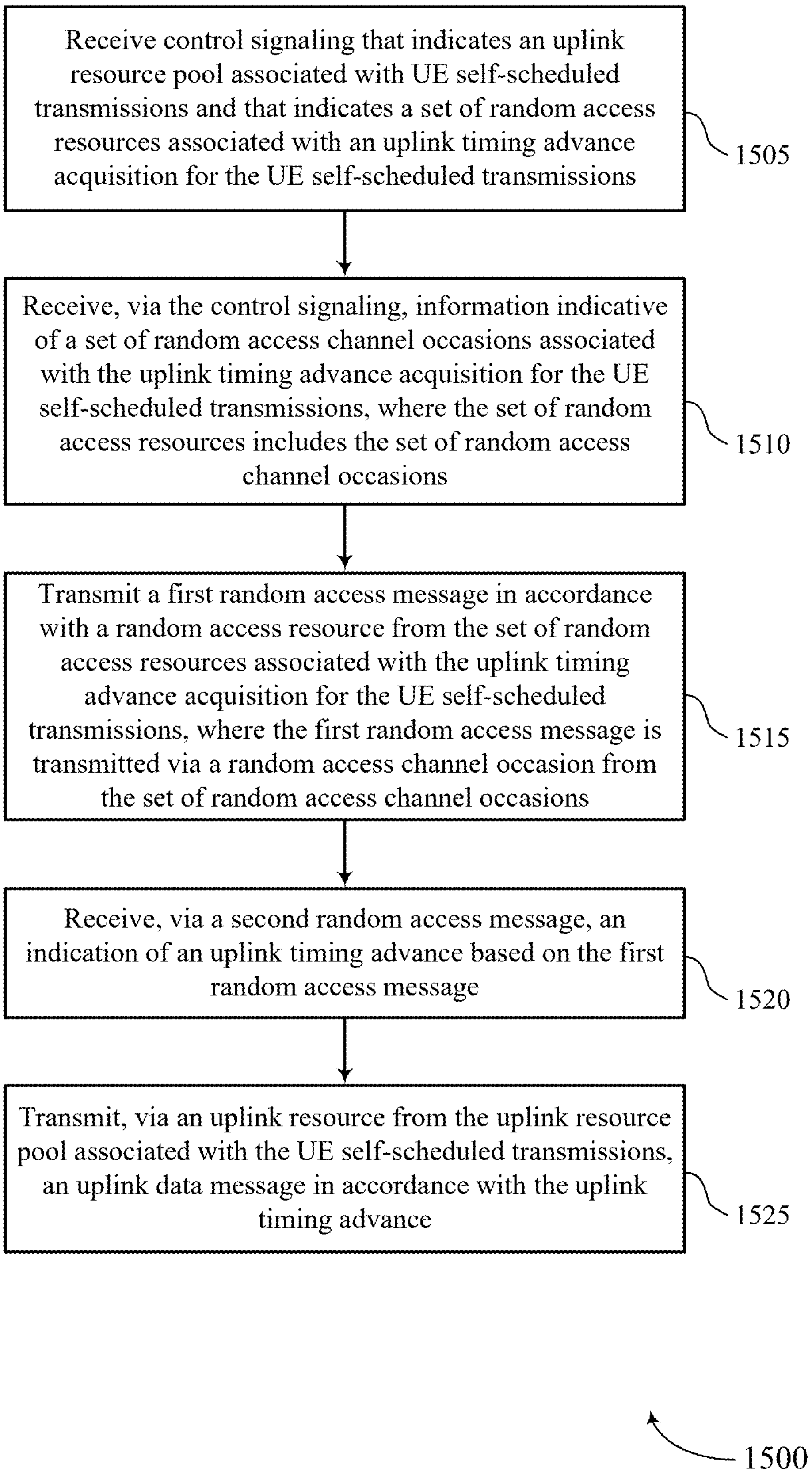

FIG. 15 shows a flowchart illustrating a method 1500 that supports user equipment initiated uplink timing advance acquisition for self-scheduled transmission in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that indicates an uplink resource pool associated with UE self-scheduled transmissions and that indicates a set of random access resources associated with an uplink timing advance acquisition for the UE self-scheduled transmissions. The operations of 1505 may be performed in accordance with examples as disclosed herein. In some examples, aspects of the operations of 1505 may be performed by a control signaling component 825 as described with reference to FIG. 8.

At 1510, the method may include receiving, via the control signaling, information indicative of a set of random access channel occasions associated with the uplink timing advance acquisition for the UE self-scheduled transmissions, where the set of random access resources includes the set of random access channel occasions. The operations of 1510 may be performed in accordance with examples as disclosed herein. In some examples, aspects of the operations of 1510 may be performed by a control signaling component 825 as described with reference to FIG. 8.

At 1515, the method may include transmitting a first random access message in accordance with a random access resource from the set of random access resources associated with the uplink timing advance acquisition for the UE self-scheduled transmissions, where the first random access message is transmitted via a random access channel occasion from the set of random access channel occasions. The operations of 1515 may be performed in accordance with examples as disclosed herein. In some examples, aspects of the operations of 1515 may be performed by a random access component 830 as described with reference to FIG. 8.

At 1520, the method may include receiving, via a second random access message, an indication of an uplink timing advance based on the first random access message. The operations of 1520 may be performed in accordance with examples as disclosed herein. In some examples, aspects of the operations of 1520 may be performed by a random access component 830 as described with reference to FIG. 8.

At 1525, the method may include transmitting, via an uplink resource from the uplink resource pool associated with the UE self-scheduled transmissions, an uplink data message in accordance with the uplink timing advance. The operations of 1525 may be performed in accordance with examples as disclosed herein. In some examples, aspects of the operations of 1525 may be performed by an uplink transmission component 835 as described with reference to FIG. 8.

Figure 16:
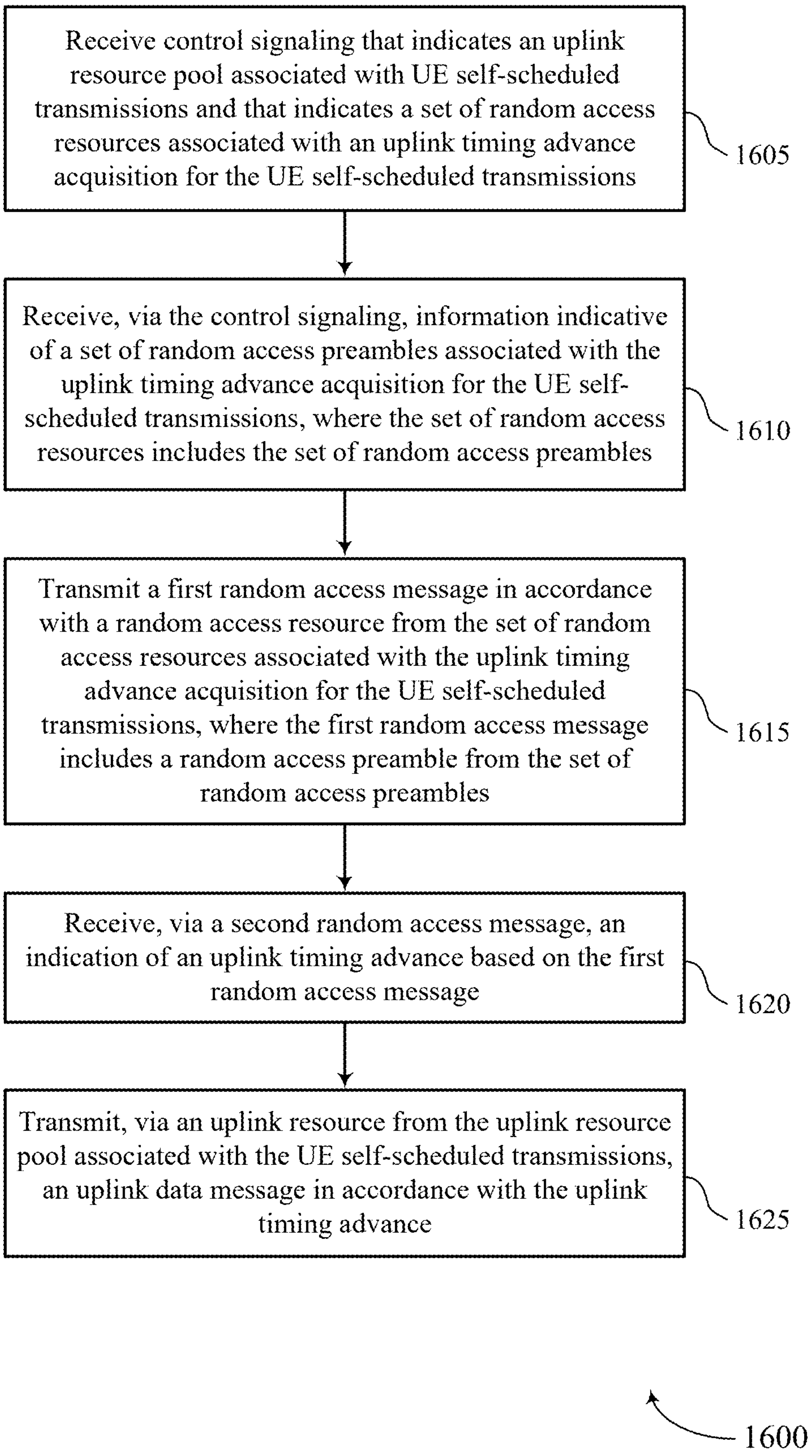

FIG. 16 shows a flowchart illustrating a method 1600 that supports user equipment initiated uplink timing advance acquisition for self-scheduled transmission in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that indicates an uplink resource pool associated with UE self-scheduled transmissions and that indicates a set of random access resources associated with an uplink timing advance acquisition for the UE self-scheduled transmissions. The operations of 1605 may be performed in accordance with examples as disclosed herein. In some examples, aspects of the operations of 1605 may be performed by a control signaling component 825 as described with reference to FIG. 8.

At 1610, the method may include receiving, via the control signaling, information indicative of a set of random access preambles associated with the uplink timing advance acquisition for the UE self-scheduled transmissions, where the set of random access resources includes the set of random access preambles. The operations of 1610 may be performed in accordance with examples as disclosed herein.

In some examples, aspects of the operations of 1610 may be performed by a control signaling component 825 as described with reference to FIG. 8.

At 1615, the method may include transmitting a first random access message in accordance with a random access resource from the set of random access resources associated with the uplink timing advance acquisition for the UE self-scheduled transmissions, where the first random access message includes a random access preamble from the set of random access preambles. The operations of 1615 may be performed in accordance with examples as disclosed herein. In some examples, aspects of the operations of 1615 may be performed by a random access component 830 as described with reference to FIG. 8.

At 1620, the method may include receiving, via a second random access message, an indication of an uplink timing advance based on the first random access message. The operations of 1620 may be performed in accordance with examples as disclosed herein. In some examples, aspects of the operations of 1620 may be performed by a random access component 830 as described with reference to FIG. 8.

At 1625, the method may include transmitting, via an uplink resource from the uplink resource pool associated with the UE self-scheduled transmissions, an uplink data message in accordance with the uplink timing advance. The operations of 1625 may be performed in accordance with examples as disclosed herein. In some examples, aspects of the operations of 1625 may be performed by an uplink transmission component 835 as described with reference to FIG. 8.

Figure 17:
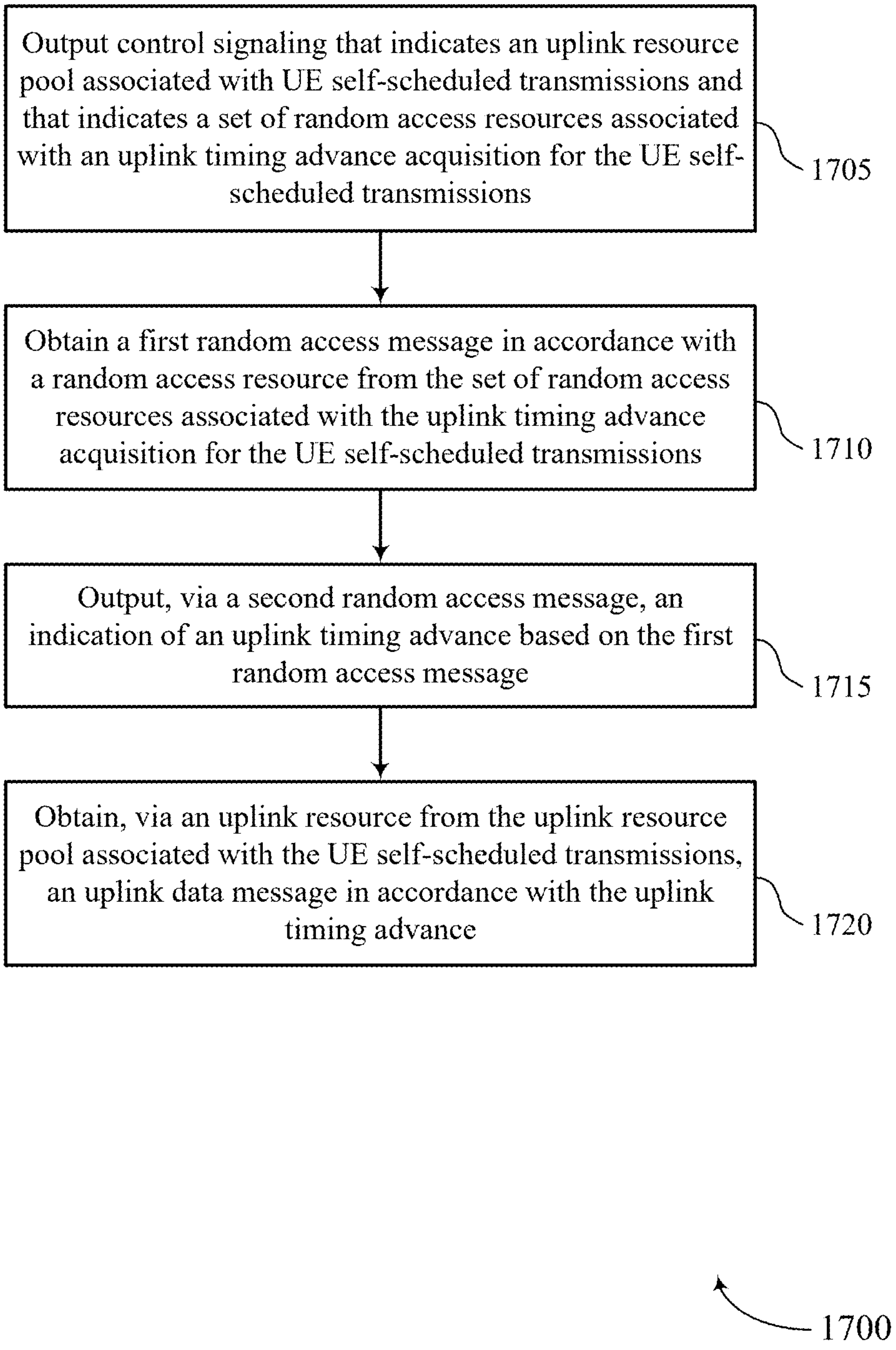

FIG. 17 shows a flowchart illustrating a method 1700 that supports user equipment initiated uplink timing advance acquisition for self-scheduled transmission in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling that indicates an uplink resource pool associated with UE self-scheduled transmissions and that indicates a set of random access resources associated with an uplink timing advance acquisition for the UE self-scheduled transmissions. The operations of 1705 may be performed in accordance with examples as disclosed herein. In some examples, aspects of the operations of 1705 may be performed by a control signaling component 1225 as described with reference to FIG. 12.

At 1710, the method may include obtaining a first random access message in accordance with a random access resource from the set of random access resources associated with the uplink timing advance acquisition for the UE self-scheduled transmissions. The operations of 1710 may be performed in accordance with examples as disclosed herein. In some examples, aspects of the operations of 1710 may be performed by a random access component 1230 as described with reference to FIG. 12.

At 1715, the method may include outputting, via a second random access message, an indication of an uplink timing advance based on the first random access message. The operations of 1715 may be performed in accordance with examples as disclosed herein. In some examples, aspects of the operations of 1715 may be performed by a random access component 1230 as described with reference to FIG. 12.

At 1720, the method may include obtaining, via an uplink resource from the uplink resource pool associated with the UE self-scheduled transmissions, an uplink data message in accordance with the uplink timing advance. The operations of 1720 may be performed in accordance with examples as disclosed herein. In some examples, aspects of the operations of 1720 may be performed by an uplink reception component 1235 as described with reference to FIG. 12.

The following provides an overview of aspects of the present disclosure:

Aspect 1: A method for wireless communication at a UE, comprising: receiving control signaling that indicates an uplink resource pool associated with UE self-scheduled transmissions and that indicates a set of random access resources associated with an uplink timing advance acquisition for the UE self-scheduled transmissions; transmitting a first random access message in accordance with a random access resource from the set of random access resources associated with the uplink timing advance acquisition for the UE self-scheduled transmissions; receiving, via a second random access message, an indication of an uplink timing advance based at least in part on the first random access message; and transmitting, via an uplink resource from the uplink resource pool associated with the UE self-scheduled transmissions, an uplink data message in accordance with the uplink timing advance.

Aspect 2: The method of aspect 1, further comprising: receiving, via the control signaling, information indicative of a second set of random access resources associated with a connection establishment between the UE and a network entity, wherein the second set of random access resources associated with the connection establishment is independent of the set of random access resources associated with the uplink timing advance acquisition for the UE self-scheduled transmissions.

Aspect 3: The method of any of aspects 1-2, further comprising: receiving, via the control signaling, information indicative of a set of random access channel occasions associated with the uplink timing advance acquisition for the UE self-scheduled transmissions, wherein the set of random access resources comprises the set of random access channel occasions, and wherein the first random access message is transmitted via a random access channel occasion from the set of random access channel occasions.

Aspect 4: The method of any of aspects 1-3, further comprising: receiving, via the control signaling, information indicative of a set of random access preambles associated with the uplink timing advance acquisition for the UE self-scheduled transmissions, wherein the set of random access resources comprises the set of random access preambles, and wherein the first random access message comprises a random access preamble from the set of random access preambles.

Aspect 5: The method of aspect 4, wherein the set of random access preambles comprises a plurality of subsets of random access preambles, and each subset of random access preambles from the plurality of subsets of random access preambles corresponds to a respective confidence level associated with a current uplink timing advance at the UE.

Aspect 6: The method of aspect 5, wherein each subset of random access preambles from the plurality of subsets of random access preambles is associated with a respective cyclic shift step size of a plurality of cyclic shift step sizes, each respective cyclic shift step size corresponding to a different confidence level at the UE.

Aspect 7: The method of any of aspects 5-6, further comprising: selecting the random access preamble from a first subset of random access preambles in accordance with the UE having a first confidence level associated with the current uplink timing advance at the UE, wherein the first subset of random access preambles corresponds to the first confidence level; and transmitting the first random access message comprising the random access preamble in accordance with the current uplink timing advance at the UE, wherein the indication of the uplink timing advance is a relative value with respect to the current uplink timing advance used to transmit the first random access message.

Aspect 8: The method of any of aspects 5-7, further comprising: receiving information indicative of one or more parameters according to which the UE determines a confidence level associated with the current uplink timing advance, wherein the UE determines a confidence level in accordance with the one or more parameters.

Aspect 9: The method of any of aspects 1-8, wherein transmitting the first random access message in accordance with the random access resource from the set of random access resources indicates, in accordance with a rule associated with the set of random access resources, an intention of the UE to acquire the uplink timing advance for a UE self-scheduled transmission via the uplink resource pool.

Aspect 10: The method of any of aspects 1-9, wherein the second random access message excludes an uplink grant in accordance with the first random access message being transmitted in accordance with the random access resource from the set of random access resources associated with the uplink timing advance acquisition for the UE self-scheduled transmissions.

Aspect 11: The method of any of aspects 1-10, wherein the first random access message comprises a msg1; the second random access message comprises a msg2; and the UE refrains from monitoring for a msg4 based at least in part on one or both of: the msg2 excluding an uplink grant for a msg3; or the msg1 being transmitted in accordance with the random access resource from the set of random access resources associated with the uplink timing advance acquisition for the UE self-scheduled transmissions.

Aspect 12: The method of any of aspects 1-11, further comprising: retransmitting the uplink data message in accordance with the uplink timing advance based at least in part on a failure to receive an acknowledgment associated with the uplink data message; transmitting, based at least in part on performing a threshold quantity of retransmissions of the uplink data message, a third random access message in accordance with a second random access resource from the set of random access resources associated with the uplink timing advance acquisition for the UE self-scheduled transmissions; receiving, via a fourth random access message, an indication of a second uplink timing advance based at least in part on transmitting the third random access message; and retransmitting the uplink data message in accordance with the second uplink timing advance.

Aspect 13: The method of aspect 12, wherein the third random access message is transmitted with a greater transmit power than the first random access message.

Aspect 14: A method for wireless communication at a network entity, comprising: outputting control signaling that indicates an uplink resource pool associated with UE self-scheduled transmissions and that indicates a set of random access resources associated with an uplink timing advance acquisition for the UE self-scheduled transmissions; obtaining a first random access message in accordance with a random access resource from the set of random access resources associated with the uplink timing advance acquisition for the UE self-scheduled transmissions; outputting, via a second random access message, an indication of an uplink timing advance based at least in part on the first random access message; and obtaining, via an uplink resource from the uplink resource pool associated with the UE self-scheduled transmissions, an uplink data message in accordance with the uplink timing advance.

Aspect 15: The method of aspect 14, further comprising: outputting, via the control signaling, information indicative of a second set of random access resources associated with a connection establishment between a UE and the network entity, wherein the second set of random access resources associated with the connection establishment is independent of the set of random access resources associated with the uplink timing advance acquisition for the UE self-scheduled transmissions.

Aspect 16: The method of any of aspects 14-15, further comprising: outputting, via the control signaling, information indicative of a set of random access channel occasions associated with the uplink timing advance acquisition for the UE self-scheduled transmissions, wherein the set of random access resources comprises the set of random access channel occasions, and wherein the first random access message is output via a random access channel occasion from the set of random access channel occasions.

Aspect 17: The method of any of aspects 14-16, further comprising: outputting, via the control signaling, information indicative of a set of random access preambles associated with the uplink timing advance acquisition for the UE self-scheduled transmissions, wherein the set of random access resources comprises the set of random access preambles, and wherein the first random access message comprises a random access preamble from the set of random access preambles.

Aspect 18: The method of aspect 17, wherein the set of random access preambles comprises a plurality of subsets of random access preambles, and each subset of random access preambles from the plurality of subsets of random access preambles corresponds to a respective confidence level associated with a current uplink timing advance at a UE.

Aspect 19: The method of aspect 18, wherein each subset of random access preambles from the plurality of subsets of random access preambles is associated with a respective cyclic shift step size of a plurality of cyclic shift step sizes, each respective cyclic shift step size corresponding to a different confidence level at the UE.

Aspect 20: The method of any of aspects 18-19, further comprising: obtaining the first random access message comprising the random access preamble from a first subset of random access preambles in accordance with the UE having a first confidence level associated with the current uplink timing advance at the UE, wherein the first subset of random access preambles corresponds to the first confidence level, and wherein the first random access message is obtained in accordance with the current uplink timing advance at the UE; and outputting the indication of the uplink timing advance as a relative value with respect to the current uplink timing advance.

Aspect 21: The method of any of aspects 18-20, further comprising: outputting information indicative of one or more parameters according to which the UE determines a confidence level associated with the current uplink timing advance, wherein obtaining the first random access message comprising the random access preamble is in accordance with the one or more parameters.

Aspect 22: The method of any of aspects 14-21, wherein obtaining the first random access message in accordance with the random access resource from the set of random access resources indicates, in accordance with a rule associated with the set of random access resources, an intention of a UE to acquire the uplink timing advance for a UE self-scheduled transmission via the uplink resource pool.

Aspect 23: The method of any of aspects 14-22, wherein the second random access message excludes an uplink grant in accordance with the first random access message being output in accordance with the random access resource from the set of random access resources associated with the uplink timing advance acquisition for the UE self-scheduled transmissions.

Aspect 24: The method of any of aspects 14-23, wherein the first random access message comprises a msg1; the second random access message comprises a msg2; and the network entity refrains from outputting a msg4 based at least in part on one or both of: the msg2 excluding an uplink grant for a msg3; or the msg1 being obtained in accordance with the random access resource from the set of random access resources associated with the uplink timing advance acquisition for the UE self-scheduled transmissions.

Aspect 25: The method of any of aspects 14-24, further comprising: obtaining a third random access message in accordance with the random access resource from the set of random access resources associated with the uplink timing advance acquisition for the UE self-scheduled transmissions, the first random access message and the third random access message comprising a same random access preamble; determining that a first received path corresponding to the third random access message is detected within a threshold time duration of a second received path corresponding to the first random access message; and generating the second random access message in accordance with identifying information associated with both the first random access message and the third random access message based at least in part on determining that the first received path corresponding to the third random access message is detected within the threshold time duration of the second received path corresponding to the first random access message.

Aspect 26: The method of aspect 25, wherein the threshold time duration comprises a cyclic prefix duration.

Aspect 27: The method of any of aspects 25-26, wherein the identifying information is based at least in part on the same random access preamble comprised by both the first random access message and the third random access message.

Aspect 28: The method of any of aspects 14-27, further comprising: obtaining a third random access message in accordance with a second random access resource from the set of random access resources associated with the uplink timing advance acquisition for the UE self-scheduled transmissions; obtaining a fourth random access message in accordance with the second random access resource from the set of random access resources associated with the uplink timing advance acquisition for the UE self-scheduled transmissions, the third random access message and the fourth random access message comprising a same random access preamble; determining that a first received path corresponding to the fourth random access message is detected more than a threshold time duration after a second received path corresponding to the third random access message; and refraining from outputting an indication of a second uplink timing advance associated with either the third random access message or the fourth random access message based at least in part on determining that the first received path corresponding to the fourth random access message is detected more than the threshold time duration after the second received path corresponding to the third random access message.

Aspect 29: The method of aspect 28, wherein the threshold time duration comprises a cyclic prefix duration.

Aspect 30: A UE or an apparatus for wireless communication at a UE, comprising one or more memories storing processor-executable code, and one or more processors coupled with the one or more memories and individually or collectively operable to execute the code to cause the UE to perform a method of any of aspects 1-13.

Aspect 31: A UE or an apparatus for wireless communication at a UE, comprising at least one means for performing a method of any of aspects 1-13.

Aspect 32: A non-transitory computer-readable medium storing code for wireless communication, the code comprising instructions executable by one or more processors to perform a method of any of aspects 1-13.

Aspect 33: A network entity or an apparatus for wireless communication at a network entity, comprising one or more memories storing processor-executable code, and one or more processors coupled with the one or more memories and individually or collectively operable to execute the code to cause the network entity to perform a method of any of aspects 14-29.

Aspect 34: A network entity or an apparatus for wireless communication at a network entity, comprising at least one means for performing a method of any of aspects 14-29.

Aspect 35: A non-transitory computer-readable medium storing code for wireless communication, the code comprising instructions executable by one or more processors to perform a method of any of aspects 14-29.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive control signaling that indicates an uplink resource pool associated with UE self-scheduled transmissions and that indicates a set of random access resources associated with an uplink timing advance acquisition for the UE self-scheduled transmissions;

transmit a first random access message in accordance with a random access resource from the set of random access resources associated with the uplink timing advance acquisition for the UE self-scheduled transmissions;

receive, via a second random access message, an indication of an uplink timing advance based at least in part on the first random access message; and transmit, via an uplink resource from the uplink resource pool associated with the UE self-scheduled transmissions, an uplink data message in accordance with the uplink timing advance.

2. The UE of claim 1, wherein the one or more processors are individually or collectively further operable to execute the code to cause the UE to:

receive, via the control signaling, information indicative of a second set of random access resources associated with a connection establishment between the UE and a network entity, wherein the second set of random access resources associated with the connection establishment is independent of the set of random access resources associated with the uplink timing advance acquisition for the UE self-scheduled transmissions.

3. The UE of claim 1, wherein the one or more processors are individually or collectively further operable to execute the code to cause the UE to:

receive, via the control signaling, information indicative of a set of random access channel occasions associated with the uplink timing advance acquisition for the UE self-scheduled transmissions, wherein the set of random access resources comprises the set of random access channel occasions, and wherein the first random access message is transmitted via a random access channel occasion from the set of random access channel occasions.

4. The UE of claim 1, wherein the one or more processors are individually or collectively further operable to execute the code to cause the UE to:

receive, via the control signaling, information indicative of a set of random access preambles associated with the uplink timing advance acquisition for the UE self-scheduled transmissions, wherein the set of random access resources comprises the set of random access preambles, and wherein the first random access message comprises a random access preamble from the set of random access preambles.

5. The UE of claim 4, wherein:

the set of random access preambles comprises a plurality of subsets of random access preambles; and each subset of random access preambles from the plurality of subsets of random access preambles corresponds to a respective confidence level associated with a current uplink timing advance at the UE.

6. The UE of claim 5, wherein each subset of random access preambles from the plurality of subsets of random access preambles is associated with a respective cyclic shift step size of a plurality of cyclic shift step sizes, each respective cyclic shift step size corresponding to a different confidence level at the UE.

7. The UE of claim 5, wherein the one or more processors are individually or collectively further operable to execute the code to cause the UE to:

select the random access preamble from a first subset of random access preambles in accordance with the UE having a first confidence level associated with the current uplink timing advance at the UE, wherein the first subset of random access preambles corresponds to the first confidence level; and transmit the first random access message comprising the random access preamble in accordance with the current uplink timing advance at the UE, wherein the indication of the uplink timing advance is a relative value with respect to the current uplink timing advance used to transmit the first random access message.

8. The UE of claim 5, wherein the one or more processors are individually or collectively further operable to execute the code to cause the UE to:

receive information indicative of one or more parameters according to which the UE determines a confidence level associated with the current uplink timing advance, wherein the UE determines a confidence level in accordance with the one or more parameters.

9. The UE of claim 1, wherein transmitting the first random access message in accordance with the random access resource from the set of random access resources indicates, in accordance with a rule associated with the set of random access resources, an intention of the UE to acquire the uplink timing advance for a UE self-scheduled transmission via the uplink resource pool.

10. The UE of claim 1, wherein the second random access message excludes an uplink grant in accordance with the first random access message being transmitted in accordance with the random access resource from the set of random access resources associated with the uplink timing advance acquisition for the UE self-scheduled transmissions.

11. The UE of claim 1, wherein:

the first random access message comprises a message 1 (msg1);

the second random access message comprises a message 2 (msg2); and the UE refrains from monitoring for a message 4 (msg4) based at least in part on one or both of:

the msg2 excluding an uplink grant for a message 3 (msg3); or the msg1 being transmitted in accordance with the random access resource from the set of random access resources associated with the uplink timing advance acquisition for the UE self-scheduled transmissions.

12. The UE of claim 1, wherein the one or more processors are individually or collectively further operable to execute the code to cause the UE to:

retransmit the uplink data message in accordance with the uplink timing advance based at least in part on a failure to receive an acknowledgment associated with the uplink data message;

transmit, based at least in part on performing a threshold quantity of retransmissions of the uplink data message, a third random access message in accordance with a second random access resource from the set of random access resources associated with the uplink timing advance acquisition for the UE self-scheduled transmissions;

receive, via a fourth random access message, an indication of a second uplink timing advance based at least in part on transmitting the third random access message; and retransmit the uplink data message in accordance with the second uplink timing advance.

13. The UE of claim 12, wherein the third random access message is transmitted with a greater transmit power than the first random access message.

14. A network entity, comprising:

one or more memories storing processor-executable code; and one or more processors coupled with the one or more memories and individually or collectively operable to execute the code to cause the network entity to:

output control signaling that indicates an uplink resource pool associated with user equipment (UE) self-scheduled transmissions and that indicates a set of random access resources associated with an uplink timing advance acquisition for the UE self-scheduled transmissions;

obtain a first random access message in accordance with a random access resource from the set of random access resources associated with the uplink timing advance acquisition for the UE self-scheduled transmissions;

output, via a second random access message, an indication of an uplink timing advance based at least in part on the first random access message; and obtain, via an uplink resource from the uplink resource pool associated with the UE self-scheduled transmissions, an uplink data message in accordance with the uplink timing advance.

15. The network entity of claim 14, wherein the one or more processors are individually or collectively further operable to execute the code to cause the network entity to:

output, via the control signaling, information indicative of a second set of random access resources associated with a connection establishment between a UE and the network entity, wherein the second set of random access resources associated with the connection establishment is independent of the set of random access resources associated with the uplink timing advance acquisition for the UE self-scheduled transmissions.

16. The network entity of claim 14, wherein the one or more processors are individually or collectively further operable to execute the code to cause the network entity to:

output, via the control signaling, information indicative of a set of random access channel occasions associated with the uplink timing advance acquisition for the UE self-scheduled transmissions, wherein the set of random access resources comprises the set of random access channel occasions, and wherein the first random access message is output via a random access channel occasion from the set of random access channel occasions.

17. The network entity of claim 14, wherein the one or more processors are individually or collectively further operable to execute the code to cause the network entity to:

output, via the control signaling, information indicative of a set of random access preambles associated with the uplink timing advance acquisition for the UE self-scheduled transmissions, wherein the set of random access resources comprises the set of random access preambles, and wherein the first random access message comprises a random access preamble from the set of random access preambles.

18. The network entity of claim 17, wherein:

the set of random access preambles comprises a plurality of subsets of random access preambles; and each subset of random access preambles from the plurality of subsets of random access preambles corresponds to a respective confidence level associated with a current uplink timing advance at a UE.

19. The network entity of claim 18, wherein each subset of random access preambles from the plurality of subsets of random access preambles is associated with a respective cyclic shift step size of a plurality of cyclic shift step sizes, each respective cyclic shift step size corresponding to a different confidence level at the UE.

20. The network entity of claim 18, wherein the one or more processors are individually or collectively further operable to execute the code to cause the network entity to:

obtain the first random access message comprising the random access preamble from a first subset of random access preambles in accordance with the UE having a first confidence level associated with the current uplink timing advance at the UE, wherein the first subset of random access preambles corresponds to the first confidence level, and wherein the first random access message is obtained in accordance with the current uplink timing advance at the UE; and output the indication of the uplink timing advance as a relative value with respect to the current uplink timing advance.

21. The network entity of claim 18, wherein the one or more processors are individually or collectively further operable to execute the code to cause the network entity to:

output information indicative of one or more parameters according to which the UE determines a confidence level associated with the current uplink timing advance, wherein obtaining the first random access message comprising the random access preamble is in accordance with the one or more parameters.

22. The network entity of claim 14, wherein obtaining the first random access message in accordance with the random access resource from the set of random access resources indicates, in accordance with a rule associated with the set of random access resources, an intention of a UE to acquire the uplink timing advance for a UE self-scheduled transmission via the uplink resource pool.

23. The network entity of claim 14, wherein the second random access message excludes an uplink grant in accordance with the first random access message being output in accordance with the random access resource from the set of random access resources associated with the uplink timing advance acquisition for the UE self-scheduled transmissions.

24. The network entity of claim 14, wherein the one or more processors are individually or collectively further operable to execute the code to cause the network entity to:

obtain a third random access message in accordance with the random access resource from the set of random access resources associated with the uplink timing advance acquisition for the UE self-scheduled transmissions, the first random access message and the third random access message comprising a same random access preamble;

determine that a first received path corresponding to the third random access message is detected within a threshold time duration of a second received path corresponding to the first random access message; and generate the second random access message in accordance with identifying information associated with both the first random access message and the third random access message based at least in part on determining that the first received path corresponding to the third random access message is detected within the threshold time duration of the second received path corresponding to the first random access message.

25. The network entity of claim 24, wherein the threshold time duration comprises a cyclic prefix duration.

26. The network entity of claim 24, wherein the identifying information is based at least in part on the same random access preamble comprised by both the first random access message and the third random access message.

27. The network entity of claim 14, wherein the one or more processors are individually or collectively further operable to execute the code to cause the network entity to:

obtain a third random access message in accordance with a second random access resource from the set of random access resources associated with the uplink timing advance acquisition for the UE self-scheduled transmissions;

obtain a fourth random access message in accordance with the second random access resource from the set of random access resources associated with the uplink timing advance acquisition for the UE self-scheduled transmissions, the third random access message and the fourth random access message comprising a same random access preamble;

determine that a first received path corresponding to the fourth random access message is detected more than a threshold time duration after a second received path corresponding to the third random access message; and refrain from outputting an indication of a second uplink timing advance associated with either the third random access message or the fourth random access message based at least in part on determining that the first received path corresponding to the fourth random access message is detected more than the threshold time duration after the second received path corresponding to the third random access message.

28. The network entity of claim 27, wherein the threshold time duration comprises a cyclic prefix duration.

29. A method for wireless communication at a user equipment (UE), comprising:

receiving control signaling that indicates an uplink resource pool associated with UE self-scheduled transmissions and that indicates a set of random access resources associated with an uplink timing advance acquisition for the UE self-scheduled transmissions;

transmitting a first random access message in accordance with a random access resource from the set of random access resources associated with the uplink timing advance acquisition for the UE self-scheduled transmissions;

receiving, via a second random access message, an indication of an uplink timing advance based at least in part on the first random access message; and transmitting, via an uplink resource from the uplink resource pool associated with the UE self-scheduled transmissions, an uplink data message in accordance with the uplink timing advance.

30. A method for wireless communication at a network entity, comprising:

outputting control signaling that indicates an uplink resource pool associated with user equipment (UE) self-scheduled transmissions and that indicates a set of random access resources associated with an uplink timing advance acquisition for the UE self-scheduled transmissions;

obtaining a first random access message in accordance with a random access resource from the set of random access resources associated with the uplink timing advance acquisition for the UE self-scheduled transmissions;

outputting, via a second random access message, an indication of an uplink timing advance based at least in part on the first random access message; and obtaining, via an uplink resource from the uplink resource pool associated with the UE self-scheduled transmissions, an uplink data message in accordance with the uplink timing advance.

* * * * *